United States Patent
Kobayashi et al.

(10) Patent No.: US 9,575,363 B2
(45) Date of Patent: Feb. 21, 2017

(54) METHOD FOR IMPROVING OPTICAL RESPONSE AND LIQUID CRYSTAL DISPLAY DEVICE USING SAME

(71) Applicants: TOKYO UNIVERSITY OF SCIENCE FOUNDATION, Tokyo (JP); DIC CORPORATION, Tokyo (JP)

(72) Inventors: Shunsuke Kobayashi, Tokyo (JP); Kiyofumi Takeuchi, Kitaadachi-gun (JP); Masakazu Kaneoya, Kitaadachi-gun (JP)

(73) Assignees: TOKYO UNIVERSITY OF SCIENCE FOUNDATION, Tokyo (JP); DIC CORPORATION, Tokyo (JP)

( * ) Notice: Subject to any disclaimer, the term of this patent is extended or adjusted under 35 U.S.C. 154(b) by 0 days.

(21) Appl. No.: 14/910,744

(22) PCT Filed: Aug. 4, 2014

(86) PCT No.: PCT/JP2014/070468
§ 371 (c)(1),
(2) Date: Feb. 8, 2016

(87) PCT Pub. No.: WO2015/019997
PCT Pub. Date: Feb. 12, 2015

(65) Prior Publication Data
US 2016/0187698 A1    Jun. 30, 2016

(30) Foreign Application Priority Data
Aug. 8, 2013  (JP) ................................. 2013-165620

(51) Int. Cl.
*G02F 1/13363* (2006.01)
*G02F 1/1335* (2006.01)
(Continued)

(52) U.S. Cl.
CPC ..... *G02F 1/13363* (2013.01); *G02F 1/133528* (2013.01); *G02F 1/133711* (2013.01);
(Continued)

(58) Field of Classification Search
CPC ............ G02F 1/13363; G02F 1/134309; G02F 1/133528; G02F 2001/133531; G02F 2001/133562; G02F 2001/133567; G02F 2001/133742
See application file for complete search history.

(56) References Cited

U.S. PATENT DOCUMENTS

| | | | | |
|---|---|---|---|---|
| 6,108,064 | A * | 8/2000 | Minoura ............. | G02F 1/13363 349/113 |
| 2007/0115417 | A1* | 5/2007 | Ge .................... | G02F 1/134363 349/141 |

FOREIGN PATENT DOCUMENTS

CN    1886694 A    12/2006
CN    101046573 A    10/2007
(Continued)

OTHER PUBLICATIONS

Osterman et al., "High-Speed Liquid Crystal Polarization Modulator for Time-Multiplexed Stereoscopic 3D Applications", LCT5-3L, IDW 2010, pp. 605-606, Cited in Specification.
(Continued)

*Primary Examiner* — Shean C Wu
(74) *Attorney, Agent, or Firm* — Westerman, Hattori, Daniels & Adrian, LLP

(57) ABSTRACT

In a liquid crystal display device 1 including a liquid crystal cell 2 having a liquid crystal layer, a first polarization plate 3 and a second polarization plate 4, and an optical compensation plate 5, when a differential coefficient of the amount of transmitted light $I_1$ with respect to a time t when the driving voltage is turned off from on in a case in which the optical compensation plate 5 is not disposed is represented (Continued)

by $\partial I_1/\partial t$, and a differential coefficient of the amount of transmitted light $I_2$ with respect to the time t when the driving voltage is turned off from on in a case in which the optical compensation plate 5 is disposed is represented by $\partial I_2/\partial t$, a phase difference in the liquid crystal layer and a phase difference in the optical compensation plate 5 are optically designed to satisfy a relationship of $|\partial I_2/\partial t| > |\partial I_1/\partial t|$.

13 Claims, 13 Drawing Sheets

(51) Int. Cl.
   *G02F 1/1337* (2006.01)
   *G02F 1/1343* (2006.01)

(52) U.S. Cl.
   CPC ............ *G02F 1/134309* (2013.01); *G02F 2001/133531* (2013.01); *G02F 2001/133562* (2013.01); *G02F 2001/133567* (2013.01); *G02F 2001/133742* (2013.01); *G02F 2413/01* (2013.01); *G02F 2413/02* (2013.01); *G02F 2413/05* (2013.01); *G02F 2413/08* (2013.01)

(56) References Cited

FOREIGN PATENT DOCUMENTS

| CN | 101604099 A | 12/2009 |
| JP | 2-20829 A | 1/1990 |
| JP | 3-185421 A | 8/1991 |
| JP | 11-249126 A | 9/1999 |
| JP | 2001-166133 A | 6/2001 |
| JP | 2007-78854 A | 3/2007 |
| JP | 2008-139769 A | 6/2008 |
| JP | 2010-72658 A | 4/2010 |
| KR | 10-0157236 B1 | 7/1998 |

OTHER PUBLICATIONS

Yeh, "Extended Jones matrix method", Optical Society of America, Apr. 1982, vol. 72, No. 4, pp. 507-513, Cited in Specification.
International Search Report dated Oct. 14, 2014, issued in counterpart Application No. PCT/JP2014/070468 (1 page).
Office Action dated Aug. 16, 2016, issued in counterpart Chinese Patent Application No. 201480043912.5, with partial English translation of Search Report. (8 pages).
Office Action dated Nov. 8, 2016, issued in counterpart Korean Application No. 10-2016-7003182, with English translation (3 pages).

* cited by examiner

METHOD FOR IMPROVING OPTICAL RESPONSE AND LIQUID CRYSTAL DISPLAY DEVICE USING SAME

TECHNICAL FIELD

The present invention relates to a method for improving the optical response of a liquid crystal display device and a liquid crystal display device using the same.

BACKGROUND ART

For example, a liquid crystal display device is widely used in a display section of not only a clock or a calculator but also in a variety of measurement instruments, a vehicle, a word processor, an electronic diary, a printer, a computer, a television, a clock, an advertisement plate, or the like.

Examples of typical display methods of a liquid crystal display device include a twisted nematic (TN)-type method, a super twisted nematic (STN)-type method, an electrically controlled birefringence (ECB)-type method, and the like. In addition, in an active matrix-type liquid crystal display device in which a thin film transistor (TFT) is used, a VA-type driving method in which liquid crystal molecules are vertically aligned and an in-plane switch (IPS)-type driving method or a fringe field switching (FFS)-type driving method in which liquid crystal molecules are horizontally aligned are employed.

In recent liquid crystal display devices, for a variety of large-sized or small and medium-sized uses, an increase in definition and resolution such as 4K×2K or 8K×4K, an increase in display resolution such as 400 ppi or 600 ppi, and the like are carried out.

For liquid crystal display devices, an improvement of the optical response is one of the new problems required to be solved to make the liquid crystal display devices suitable for the above-described increases. Specifically, examples of a method for improving the optical response of a liquid crystal display device include the following means (1) to (5).

(1) To decrease the thickness of a liquid crystal layer
(2) To decrease the viscoelasticity of a liquid crystal material
(3) To improve the halftone response caused by application of overvoltage (referred to as overdrive method)
(4) To interpolate an image connecting movie frame by increasing the refresh rate (referred to as double speed drive)
(5) To drive a two-layer panel including a liquid crystal cell disposed at an optical compensation position under a specific condition (refer to NPL 1)

Meanwhile, in a liquid crystal display device, in order to achieve the above-described increase in definition, resolution, and display resolution, it is necessary to widen the viewing angle or improve color reproducibility and the like. Therefore, a number of research and development projects are underway at the moment.

As a useful method therefor, for example, there is a method in which a retarder (optical compensator) such as a negative A plate, a positive A plate, a negative C plate, a positive C plate, a biaxial plate, a half-wavelength plate, or a quarter-wavelength plate is used.

However, among these techniques, there are no techniques that improve the optical response using the design of a retarder (refer to PTLs 1 to 4). Therefore, regarding the method for improving the optical response of a liquid crystal display device, there have been no changes from the above-described way of thinking in the related art.

In addition, the response time of a liquid crystal display device with respect to a driving voltage is considered to follow Expressions A and B below which are solutions to a torque equation with respect to an external field. However, this way of thinking is not fundamentally wrong but is inaccurate.

$$\tau r = \frac{\gamma 1 d^2}{\Delta_\varepsilon (V^2 - Vth^2)} \quad \text{Expression A}$$

$$\tau d = \frac{\gamma 1 d^2}{n^2 K} \quad \text{Expression B}$$

(In Expressions A and B, "τr" represents the response time during a rise time (ON), "τd" represents the response time during a fall time (OFF), "γl" represents the viscosity coefficient of a liquid crystal, "K" represents the elastic modulus of a liquid crystal, "d" represents the layer thickness of a liquid crystal, "Δ∈" represents the dielectric anisotropy of a liquid crystal, "V" represents a driving voltage, and "Vth" represents the threshold voltage.)

That is, Expressions A and B, accurately speaking, represent only the motion of a liquid crystal molecule and do not directly represent the temporal change in the amount of transmitted light through a liquid crystal display device. That is, the optical response of a liquid crystal display device can be considered as, for example, a time corresponding to a predetermined change in the amount of transmitted light when light passes through a pixel in a liquid crystal display device.

The amount of transmitted light through a liquid crystal display device is determined depending on the disposition of a polarization plate, the phase difference of a liquid crystal layer, the phase difference of a phase difference film, and the like. Therefore, Expressions A and B simply represent only the molecular movement in a liquid crystal layer and do not represent the temporal change in the amount of transmitted light which is directly related to the optical response of a liquid crystal display device.

CITATION LIST

Patent Literature

[PTL 1] Japanese Unexamined Patent Application, First Publication No. H11-249126
[PTL 2] Japanese Unexamined Patent Application, First Publication No. 2007-78854
[PTL 3] Japanese Unexamined Patent Application, First Publication No. 2008-139769
[PTL 4] Japanese Unexamined Patent Application, First Publication No. 2010-72658

Non-Patent Literature

[NPL 1] IDW2010 DIGEST p. 605

SUMMARY OF INVENTION

Technical Problem

The present invention has been proposed in consideration of the above-described circumstances of the related art, and an object of the present invention is to provide a method for improving the optical response with respect to a temporal change in the amount of transmitted light through a liquid crystal display device and a liquid crystal display device for which the same method is used.

Solution to Problem

In order to achieve the above-described object, the present invention provides the following means.

[1] A method for improving optical response, in which, in a liquid crystal display device comprising:
a liquid crystal cell including
a first substrate and a second substrate disposed opposite to each other,
a liquid crystal layer sandwiched between the first substrate and the second substrate,
an alignment layer that controls the alignment state of the liquid crystal layer between the first substrate and the second substrate, and
an electrode that changes the alignment state of the liquid crystal layer using an electric field generated by application of a driving voltage;
a first polarization plate and a second polarization plate which are disposed on a rear surface side and a front surface side of the liquid crystal cell and in which orientations of individual transmission axes are set so that the amount of transmitted light through the liquid crystal cell from the rear surface side to the front surface side is maximized or minimized when the driving voltage is applied; and
an optical compensation plate which is disposed between the first polarization plate and the liquid crystal cell and/or between the second polarization plate and the liquid crystal cell and optically compensates for light passing therebetween,
in which, when a differential coefficient of the amount of transmitted light $I_1$ with respect to a time t when the driving voltage is turned off from on in a case in which the optical compensation plate is not disposed is represented by $\partial I_1/\partial t$, and a differential coefficient of the amount of transmitted light $I_2$ with respect to the time t when the driving voltage is turned off from on in a case in which the optical compensation plate is disposed is represented by $\partial I_2/\partial t$, a phase difference in the liquid crystal layer and a phase difference in the optical compensation plate are optically designed so as to satisfy a relationship of Expression (1) shown below:

$$|\partial I_2/\partial t| > |\partial I_1/\partial t| \tag{1}$$

thereby improving the optical response during a fall time (OFF) from a voltage V1 to a voltage V2 which have a magnitude relationship of V1>V2.

[2] The liquid crystal display device according to [1], in which, in the liquid crystal layer and the optical compensation plate, phase differences [rad] caused by individual retardations occurring when the driving voltage is turned off are made to be equal to each other and are smaller than π/2.

[3] The method for improving optical response according to [1] or [2], in which the first polarization plate and the second polarization plate have a positional relationship in which individual transmission axes thereof are orthogonal to each other when seen in a normal direction,
the liquid crystal layer and the optical compensation plate have a positional relationship in which individual slow axes thereof are orthogonal to each other when seen in a normal direction, and
an angle [rad] formed by the transmission axis and the slow axis is π/4.

[4] The method for improving optical response according to any one of [1] to [3], in which, in the liquid crystal cell, the liquid crystal layer is driven in a voltage control birefringence mode.

[5] The method for improving optical response according to any one of [1] to [4], in which, in the liquid crystal cell, when the driving voltage is not applied, the alignment state of the liquid crystal layer is a horizontal alignment.

[6] The method for improving optical response according to any one of [1] to [4], in which, in the liquid crystal cell, when the driving voltage is not applied, the alignment state of the liquid crystal layer is a vertical alignment.

[7] The method for improving optical response according to any one of [1] to [6], in which the optical compensation plate is a retarder.

[8] The method for improving optical response according to [7], in which the retarder includes any one of an A plate, a C plate, and a biaxial plate.

[9] The method for improving optical response according to any one of [1] to [8], in which the optical compensation plate is a liquid crystal cell for optical compensation.

[10] The method for improving optical response according to any one of [1] to [9], in which the liquid crystal layer includes any one of a nematic liquid crystal, a smectic liquid crystal, a cholesteric liquid crystal, and a ferroelectric liquid crystal.

[11] The method for improving optical response according to [10], in which the liquid crystal layer includes liquid crystal compounds represented by General Formulae (L1) to (L3) shown below:

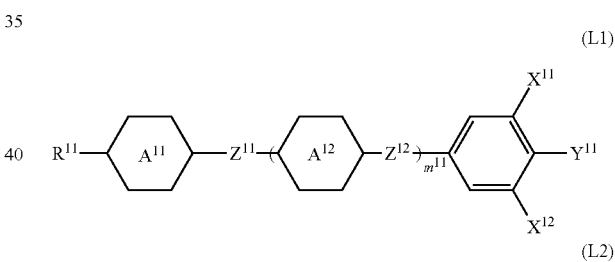

(L1)

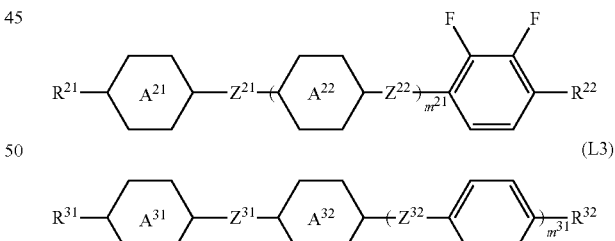

(L2)

(L3)

[12] The method for improving optical response according to any one of [1] to [11], in which the liquid crystal cell includes a nonlinear active element electrically connected to the electrode.

[13] The method for improving optical response according to any one of [1] to [12], in which the alignment layer includes any one of a polyimide, a polyamide, chalcone, cinnamate, and cinnamoyl.

[14] A liquid crystal display device, in which the method for improving optical response according to any one of [1] to [13] is used.

[15] A liquid crystal display device comprising:
a liquid crystal cell including
a first substrate and a second substrate disposed opposite to each other,
a liquid crystal layer sandwiched between the first substrate and the second substrate,
an alignment layer that controls the alignment state of the liquid crystal layer between the first substrate and the second substrate, and
an electrode that changes the alignment state of the liquid crystal layer using an electric field generated by application of a driving voltage;
a first polarization plate and a second polarization plate which are disposed on a rear surface side and a front surface side of the liquid crystal cell and in which orientations of individual transmission axes are set so that the amount of transmitted light through the liquid crystal cell from the rear surface side to the front surface side is maximized or minimized when the driving voltage is applied; and
an optical compensation plate which is disposed between the first polarization plate and the liquid crystal cell and/or between the second polarization plate and the liquid crystal cell and optically compensates for light passing therebetween,
in which, when a differential coefficient of the amount of transmitted light $I_1$ with respect to a time t when the driving voltage is turned off from on in a case in which the optical compensation plate is not disposed is represented by $\partial I_1/\partial t$, and a differential coefficient of the amount of transmitted light $I_2$ with respect to the time t when the driving voltage is turned off from on in a case in which the optical compensation plate is disposed is represented by $\partial I_2/\partial t$, a phase difference in the liquid crystal layer and a phase difference in the optical compensation plate are optically designed so as to satisfy a relationship of Expression (1) shown below:

$$|\partial I_2/\partial t| > |\partial I_1/\partial t| \quad (1).$$

Advantageous Effects of Invention

As described above, in the present invention, it is possible to improve the optical response during a fall time (OFF) from a voltage V1 to a voltage V2 which have a magnitude relationship of V1>V2 by optically designing a phase difference in the liquid crystal layer and a phase difference in the optical compensation plate so as to satisfy Expression (1). Therefore, in a large-sized liquid crystal display device in which a wide viewing angle is important or a medium and small-sized liquid crystal display pursuing a high resolution as well, it is possible to obtain excellent optical response without relying on improvement in the properties of a liquid crystal material.

DESCRIPTION OF EMBODIMENTS

Figure 1:
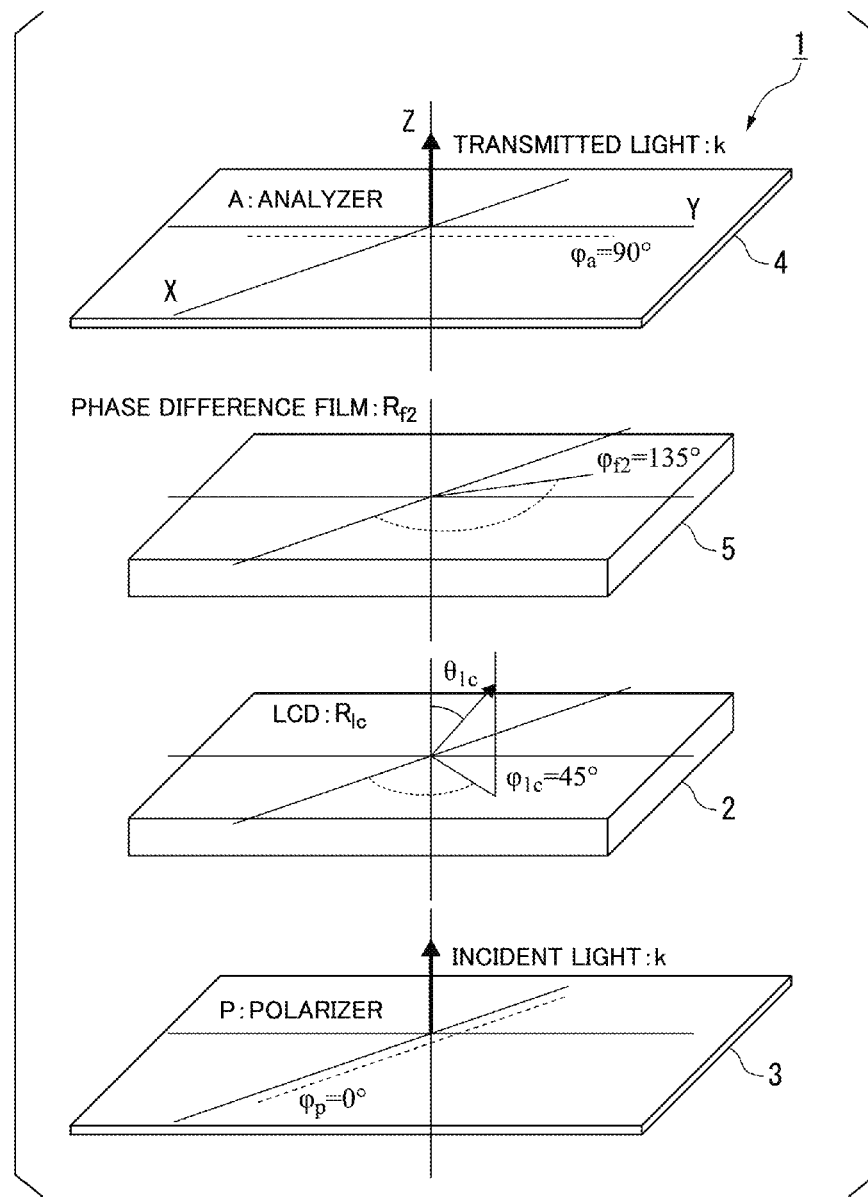
FIG. 1 is a schematic view showing an example of optical dispositions in individual sections constituting a liquid crystal optical element.

Hereinafter, an embodiment of the present invention will be described in detail with reference to the drawings.

Meanwhile, in the drawings used in the following description, there are cases in which characteristic sections are schematically shown for convenience in order to make the characteristics more easily understandable, and the dimensional ratios and the like of individual constituents are not always equal to the actual dimensional ratios and the like. In addition, materials, dimensions, and the like in the following description are simply exemplary examples, and the present invention is not always limited thereto and can be carried out with appropriate modification within the scope of the main concept of the present invention.

First, an example of a method for improving the optical response of a liquid crystal display device to which the present invention is applied will be described with reference to FIGS. 1 and 2.

Meanwhile, FIG. 1 is a schematic view showing optical dispositions in individual sections constituting a liquid crystal optical element 1. FIG. 2 is a schematic view showing optical dispositions in the respective sections in a case in which a retarder (optical compensation plate) 5 is not disposed in the liquid crystal optical element 1 shown in FIG. 1.

As shown in FIG. 1, schematically, the liquid crystal optical element 1 includes a liquid crystal cell 2, a first polarization plate 3, a second polarization plate 4, and a retarder 5.

The liquid crystal cell 2 is in a homogenous alignment (horizontal alignment) in which, when a driving voltage is not applied, liquid crystal molecules in a nematic liquid crystal layer are in the surface of a substrate. The liquid crystal cell 2 is disposed between the first polarization plate 3 and the second polarization plate 4.

The first polarization plate 3 is disposed as a polarizer P on a rear surface side of the liquid crystal cell 2. The second polarization plate 4 is disposed as an analyzer A on a front surface side of the liquid crystal cell 2. The first polarization plate 3 and the second polarization plate 4 have a positional relationship in which individual transmission axes thereof are orthogonal to each other when seen in a normal direction. Meanwhile, in FIG. 1, the normal direction of the first polarization plate 3 and the second polarization plate 4 is considered as the Z-axis direction in the X-Y-Z coordinate system, the transmission axis of the first polarization plate 3 is matched to the X-axis direction in the X-Y-Z coordinate system, and the transmission axis of the second polarization plate 4 is matched to the Y-axis direction in the X-Y-Z coordinate system.

In the liquid crystal cell 2, the slow axis in the liquid crystal layer is matched to a direction deviated from the X-axis direction by 45°. The retarder 5 is an A plate disposed between the liquid crystal cell 2 and the second polarization plate 4. In the retarder 5, the slow axis thereof is matched to a direction deviated from the X-axis direction by 135°.

Figure 2:
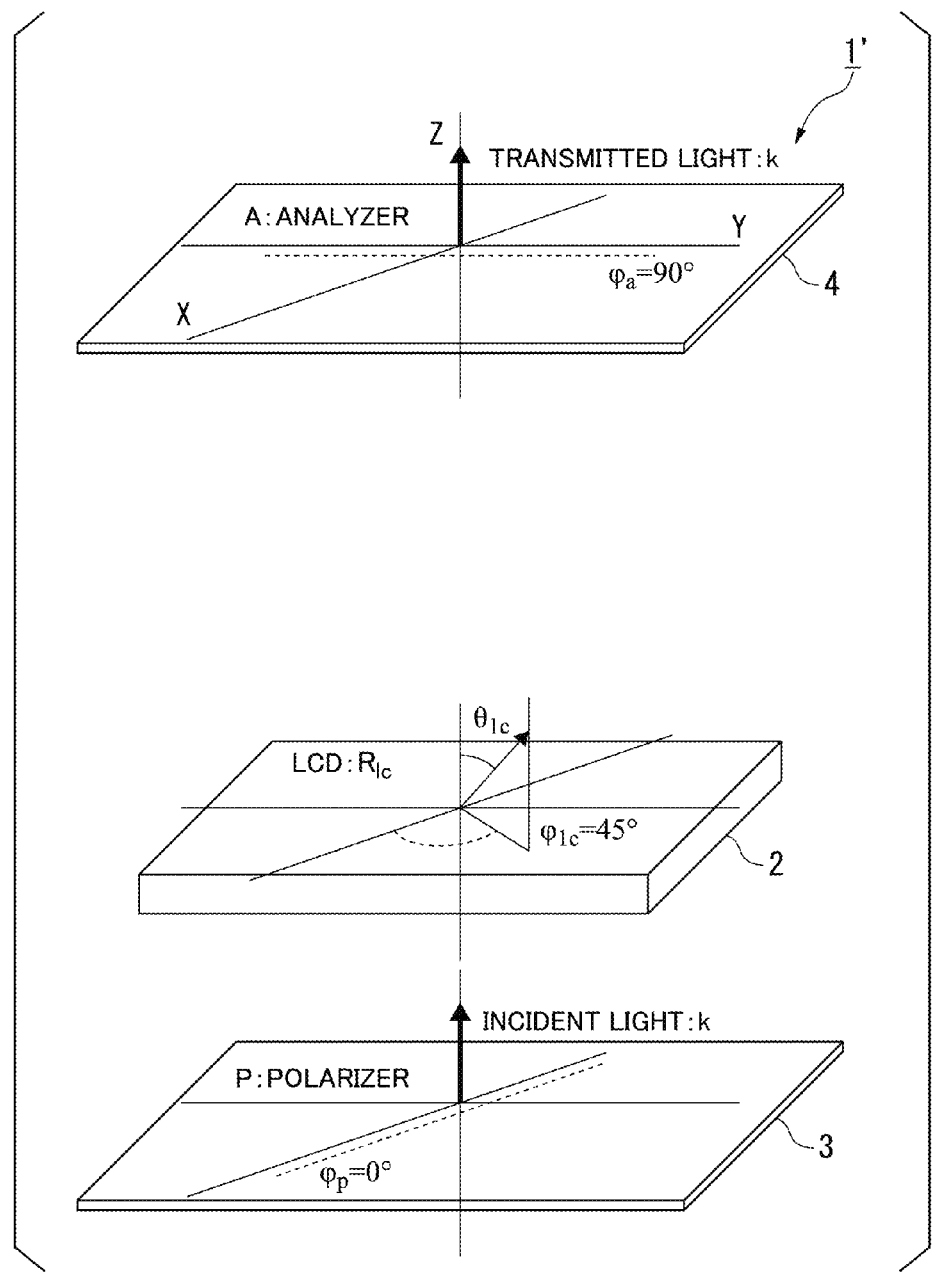
FIG. 2 is a schematic view in a case in which a retarder is not disposed in the liquid crystal optical element shown in FIG. 1.

Here, a liquid crystal optical element 1' that is the liquid crystal optical element 1 shown in FIG. 1 in which the retarder 5 is not disposed is shown in FIG. 2. In addition, the amount of transmitted light of the liquid crystal optical element 1' in which the retarder 5 is not disposed is represented by $I_1$. Meanwhile, the amount of transmitted light of the liquid crystal optical element 1 in which the retarder 5 is disposed is represented by $I_2$. In addition, in each of the liquid crystal optical elements 1 and 1' shown in FIGS. 1 and 2, incident light with a wavelength k is made incident thereon vertically (in a direction parallel to the Z axis) from the rear surface side of the liquid crystal cell 2, and transmitted light is emitted therefrom vertically (in the direction parallel to the Z axis) from the front surface side of the liquid crystal cell 2.

When a phase difference in the liquid crystal layer in the liquid crystal cell 2 (LCD) is represented by Rlc and a phase difference in the retarder 5 is represented by Rf, the phase difference Rf in the retarder 5 does not change with respect to the driving voltage or time. Meanwhile, the phase difference Rlc in the liquid crystal layer is expressed as $d\Delta n(V, t)$ when the distance between substrates in the liquid crystal cell 2 is represented by d, the driving voltage is represented by V, the time is represented by t, and the birefringence of the liquid crystal layer is represented by $\Delta n(V, t)$. Therefore, the phase difference Rlc in the liquid crystal layer changes with respect to the driving voltage or time.

Effective $\Delta n(V, t)$ can be calculated by paying attention to the director of a nematic liquid crystal which is determined using a continuum elastic theory or a torque equation of a relaxation phenomenon and using the slope angle $\theta_{lc}(V, t, Z)$ from the Z axis thereof Therefore, the slope angle $\theta_{lc}$ is considered to temporally change when the driving voltage is turned off from on (fall time). The amounts of transmitted light $I_1$ and $I_2$ are both expressed using the state of $\Delta n(t)$ which is determined by $\theta_{lc}(t)$ that temporally changes.

On the basis of the above-described relationships, the amounts of transmitted light $I_1$ and $I_2$ and the temporal changes thereof $\partial I_1/\partial t$ and $\partial I_2/\partial t$ are expressed using Expressions 2a, 2b, 3a, and 3b below. In addition, the phase difference Rlc(t) in the liquid crystal layer is expressed using Expression 4.

$$I_1 = I_0 \sin^2\left(\frac{\pi Rlc}{\lambda}\right) \quad \text{Expression 2a}$$

$$\frac{\partial}{\partial t}I_1 = \frac{\pi}{\lambda} I_0 \sin 2\left(\frac{\pi Rlc}{\lambda}\right)\left(\frac{\partial}{\partial t}\right) R_{lc} \quad \text{Expression 2b}$$

$$I_2 = I_0 \sin^2\left(\frac{\pi(R_{lc} - Rf)}{\lambda}\right) \quad \text{Expression 3a}$$

$$\frac{\partial}{\partial t}I_2 = \frac{\pi}{\lambda} I_0 \sin 2\left(\frac{\pi(R_{lc} - Rf)}{\lambda}\right)\frac{\partial}{\partial t}R_{lc} \quad \text{Expression 3b}$$

$$R_{lc}(t) = d\Delta n(t) \quad \text{Expression 4}$$

For an improvement in the optical response with respect to a temporal change in the amount of transmitted light which is the object of the present invention, when the differential coefficient of the amount of transmitted light $I_1$ with respect to a time t when the driving voltage V is turned off from on (fall time) in a case in which the retarder 5 is not disposed is represented by $\partial I_1/\partial t$, and the differential coefficient of the amount of transmitted light $I_2$ with respect to the time t when the driving voltage is turned off from on (fall time) in a case in which the retarder 5 is disposed is represented by $\partial I_2/\partial t$, it is necessary to optically design the phase difference Rlc in the liquid crystal layer and the phase difference Rf in the retarder 5 so as to satisfy Expression (1) below:

$$|\partial I_2/\partial t| > |\partial I_1/\partial t| \quad (1).$$

Here, whether the optical response with respect to a temporal change in the amount of transmitted light is fast or slow is determined by comparing the degrees of the amounts of transmitted light $I_1$ and $I_2$ with respect to a temporal change. Therefore, it is necessary to obtain a preferred condition for the phase difference Rlc in the liquid crystal layer and the phase difference Rf in the retarder 5 which determine a magnitude relationship between the absolute value of Expression 2b and the absolute value of Expression 3b.

Specifically, in the present embodiment, the preferred condition therefore is obtained when the value of the expression in the curly bracket in Expression 5a below which is derived from Expressions 2b and 3b reaches one or higher.

The phase difference Rlc in the liquid crystal layer and the phase difference Rf in the retarder 5 when the driving voltage V is not applied (V=0) have an optically compensating relationship with each other, and thus Rlc (V=0) is considered to be equal to Rf. In addition, the slope angle $\theta_{lc}$ at this time is 90°.

A preferred condition for obtaining a phase difference Rlc in the liquid crystal layer at which the amount of transmitted light $I_1$ when the driving voltage V is not applied (V=0) is large enough to produce sufficient brightness is that $\pi Rlc/\lambda$ approximates to $\pi/2$ ($\pi Rlc/\lambda = \pi/2$). Therefore, in a case in which this condition is applied to the phase difference Rf in the retarder 5, the phase difference Rf in the retarder 5 is expressed using Expression 5b below by replacing Expression 5c below, which is the above-described approximation expression, into Expression 5a below:

$$\left|\frac{\partial}{\partial t}I_2\right| = \left|\frac{\partial}{\partial t}I_1\left\{\cos 2\left(\frac{\pi Rf}{\lambda}\right) - \sin 2\left(\frac{\pi Rf}{\lambda}\right)\cot 2\left(\frac{\pi Rlc}{\lambda}\right)\right\}\right| \quad \text{Expression 5a}$$

$$\cong \left|\frac{\partial}{\partial t}I_1\left\{1 - 2\alpha\cos 2\left(\frac{\pi Rlc}{\lambda}\right)\Big/\sin 2\left(\frac{\pi Rlc}{\lambda}\right)\right\}\right| \quad \text{Expression 5b}$$

-continued $$\frac{\pi Rf}{\lambda} \cong \pi/2 - \alpha (\alpha \cong 0) \quad \text{Expression 5c}$$

$$|\partial/\partial tI_2| = |\partial/\partial tI_1|\{\cos\ 2(\pi Rf/\lambda) - \sin\ 2(\pi Rf/\lambda)\cot\ 2(\pi Rlc/\lambda)\}| \quad \text{Expression 5a}$$

$$\pi Rf/\lambda \cong \pi/2 - \alpha\ (\alpha \cong 0) \quad \text{Expression 5c}$$

Here, when the driving voltage V is high, the phase difference Rlc (V) in the liquid crystal layer approximates to zero (reaches at least π/4 or lower). Therefore, the trigonometric function in the second term in the curly bracket of Expression 5b has a positive value.

Therefore, when α<0 is set, the value of the expression in the curly bracket in Expression 5b is higher than 1 at all times. In summary, when πRlc (V=0)/λ<π/2 and πRf/λ<π/2, the absolute value of ∂I$_2$/∂t in Expression 3b becomes larger than the absolute value of ∂I$_1$/∂t in Expression 2b, and thus the relationship of Expression (1) is obtained.

Based on what has been described above, it has been clarified that, when the phase difference Rlc in the liquid crystal layer and the phase difference Rf in the retarder are optically designed so as to satisfy Expression (1), it became possible to improve the optical response with respect to a temporal change in the amount of transmitted light.

A phase plate needs to satisfy Expression (1). Specifically, as the retarder, at least one of an A plate, a C plate, and a biaxial plate is preferably provided, and an A plate and a C plate are preferably combined together.

Furthermore, with respect to at least incident light with a wavelength of λ incident in the normal direction, it is preferable that the phase difference Rlc in the liquid crystal layer and the phase difference Rf in the retarder 5 are equal to each other and are smaller than π/2. More specifically, in the liquid crystal layer and the retarder 5, the phase differences [rad] caused by individual retardations occurring when the driving voltage is turned off preferably fall into a range smaller than π/2 by 0.1 to 0.6. In such a case, it is possible to accelerate the optical response (fall time) with respect to a temporal change in the amount of transmitted light during a fall time (OFF) compared with that in a case in which the retarder 5 is not disposed.

In addition, when the driving voltage or driving voltage amplitude in a case in which the retarder 5 is not disposed is represented by $V_{LC1}$ and the driving voltage or driving voltage amplitude in a case in which the retarder 5 is disposed is represented by $V_{LC2}$, the liquid crystal cell 2 is driven so as to satisfy Expression (2) below:

$$V_{LC1} < V_{LC2} \quad (2).$$

In such a case, while the optical response (rise time) with respect to a temporal change in the amount of transmitted light when the driving voltage is turned on from off (rise time) becomes slower than that during a fall time, when the liquid crystal cell 2 is driven so as to satisfy Expression (2), it is possible to significantly improve the optical response with respect to a temporal change in the amount of transmitted light during a fall time while improving the optical response with respect to a temporal change in the amount of transmitted light during a rise time.

As described above, in the present invention, when the phase difference Rlc in the liquid crystal layer and the phase difference Rf in the retarder 5 are optically designed so as to satisfy Expression (1), it is possible to improve the optical response during a fall time (OFF) from a voltage V1 to a voltage V2 which have a magnitude relationship of V1>V2.

Therefore, even in a large-sized liquid crystal display device in which a wide viewing angle is important or a medium and small-sized liquid crystal display demanded high resolution, it is possible to obtain excellent optical response without relying on improvement in the properties of a liquid crystal material.

[Liquid Crystal Cell]

Next, a specific constitution of the liquid crystal cell will be described using examples of a liquid crystal cell 20 shown in FIG. 13 and a liquid crystal cell 30 shown in FIG. 14.

Figure 13:
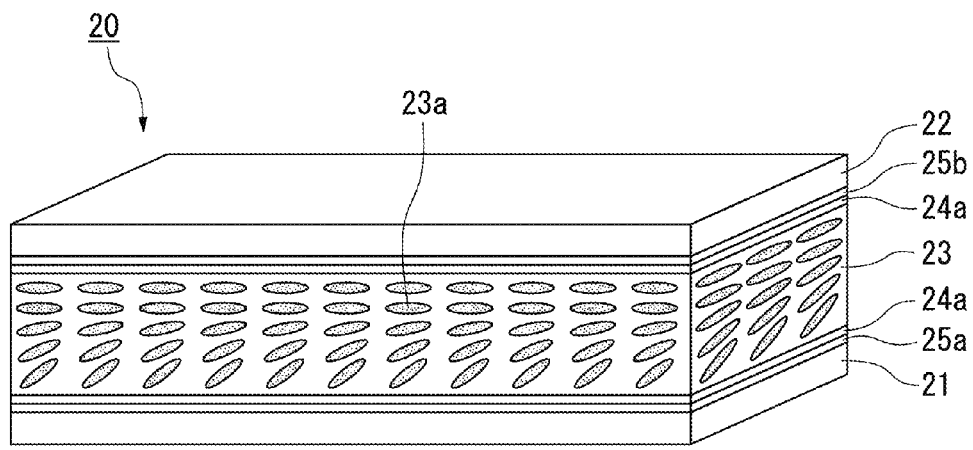
FIG. 13 is a perspective view showing an example of a liquid crystal cell.

The liquid crystal cell 20 shown in FIG. 13 includes a first substrate 21, a second substrate 22, and a liquid crystal layer 23 sandwiched between the first substrate 21 and the second substrate 22.

On surfaces of the first substrate 21 and the second substrate 22 which face each other, alignment layers 24a and 24b which control the alignment state in the liquid crystal layer 23 and transparent electrodes 25a and 25b which change the alignment state in the liquid crystal layer 23 using an electric field generated by application of a driving voltage are provided, respectively.

For example, in the case of a horizontal alignment type such as a TN mode or an STN mode, the alignment layers 24a and 24b align liquid crystal molecules 23a in the liquid crystal layer 23 in a substantially horizontal direction (horizontal alignment) with respect to the surface of the substrate when the driving voltage is not applied. Here, the substantially horizontal direction includes both a horizontal direction and an approximately horizontal direction.

On the other hand, in the case of a vertical alignment type such as a VA mode, the alignment layers 24a and 24b align the liquid crystal molecules 23a in the liquid crystal layer 23 in a substantially vertical direction (vertical alignment) with respect to the surface of the substrate when the driving voltage is not applied. Here, the substantially vertical direction includes both a vertical direction and an approximately vertical direction.

The liquid crystal cell 20 may be either a passive matrix display type or an active matrix display type. Examples of the passive matrix display type include a STN mode and the like. In the STN mode, the transparent electrode 25a on the first substrate 21 and the transparent electrode 25b on the second substrate 22 are patterned in a stripe shape so as to be orthogonal to each other.

Examples of the active matrix display type include a TN mode, a VA mode, and the like. In the active matrix display type, multiple pixel electrodes are arranged in a matrix shape in the structure and are independently controlled to be driven using non-linear active elements (not shown) that are electrically connected to the respective pixel electrodes. Therefore, in the active matrix display type, any one of the transparent electrodes 25a and 25b is a pixel electrode, and the other is a common electrode.

Figure 14:
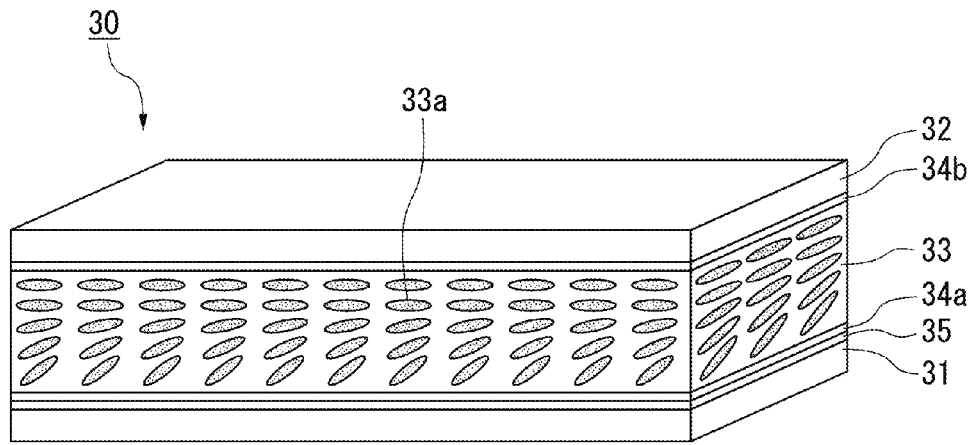
FIG. 14 is a perspective view showing another example of a liquid crystal cell.

The liquid crystal cell 30 shown in FIG. 14 includes a first substrate 31, a second substrate 32, and a liquid crystal layer 33 sandwiched between the first substrate 31 and the second substrate 32.

On surfaces of the first substrate 21 and the second substrate 22 which face each other, alignment layers 34a and 34b which respectively control the alignment state in the liquid crystal layer 23 are provided. In addition, on the surface of the first substrate 21 facing the second substrate 22, a transparent electrode 35 which changes the alignment state in the liquid crystal layer 23 using an electric field generated by application of a driving voltage is provided.

That is, the liquid crystal cell 30 has a constitution in which the electrode is provided on only one substrate of the first substrate 21 and the second substrate 22. This constitution is applied to, for example, a horizontal alignment type such as an IPS mode. In the case of the IPS mode, the alignment layers 34a and 34b align liquid crystal molecules 33a in the liquid crystal layer 33 in a substantially horizontal direction (horizontal alignment) with respect to the surface of the substrate when the driving voltage is not applied. In the case of the IPS mode, the transparent electrode 35 constitutes a comb electrode made up of a common electrode and a pixel electrode.

[Liquid Crystal Layer]

Next, the liquid crystal layers 23 and 33 will be specifically described.

For the liquid crystal layers 23 and 33, a liquid crystal material such as a nematic liquid crystal, a smectic liquid crystal, a ferroelectric liquid crystal, or a cholesteric liquid crystal can be used, and, among these, a liquid crystal having a nematic phase is particularly preferably used.

Regarding the dielectric anisotropies of the liquid crystal layers 23 and 33, both positive dielectric anisotropy and negative dielectric anisotropy can be used, but $\pi \Lambda \Delta n / \lambda$ is preferably approximately $\pi/2$ or smaller than $\pi/2$, and consequently, a material having a smaller birefringence $\Delta n$ of the liquid crystal layer is preferably used.

Therefore, the liquid crystal layer in the present invention more preferably includes a liquid crystal compound represented by General Formulae (L1) to (L3).

The liquid crystal material used for the above-described optical measurement includes a compound represented by General Formula (L1) below and a compound represented by General Formula (L3). Since the thickness $\Lambda$ of a practically-used liquid crystal layer is in a range of approximately 1 μm to 4 μm, the birefringence $\Delta n$ of the liquid crystal material can be selected from a range of 0.04 to 0.15 and is preferably in a range of 0.05 to 0.12 and more preferably in a range of 0.06 to 0.10.

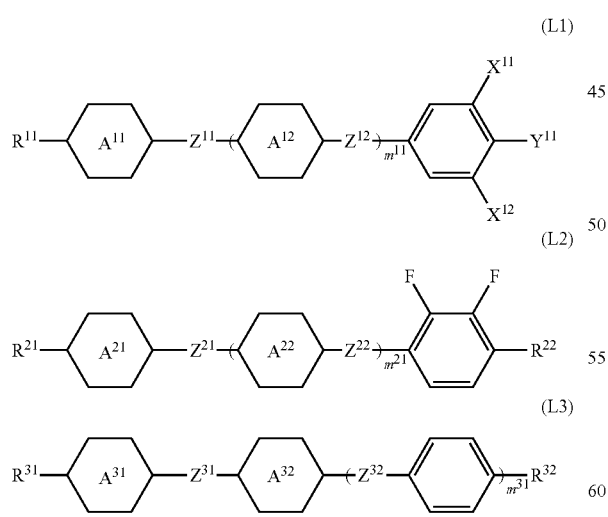

In the formulae, each of R11 to R32 independently represents an alkyl group, alkoxy group, alkenyl group, or alkenyloxy group having 1 to 15 carbon atoms.

Each of A11 to A32 independently represents any one of the following structures.

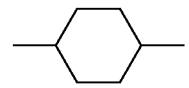 Cy

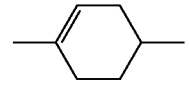 Cy$_1$

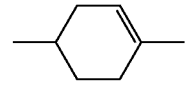 Cy$_2$

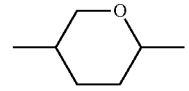 Pr$_1$

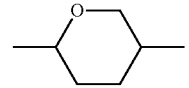 Pr$_2$

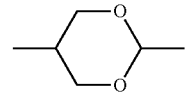 Oc$_1$

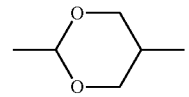 Oc$_2$

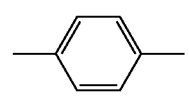 Ph

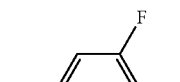 Ph$_1$

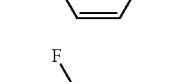 Ph$_2$

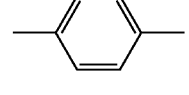 Ph$_3$

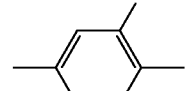 Ph$_4$

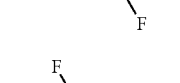 Ph$_5$

In the formulae, each of $Z^{11}$ to $Z^{32}$ independently represents a single bond, —CH=CH—. —C≡C—, —CH$_2$CH$_2$—, —(CH$_2$)$_4$—, —OCH$_2$—, —CH$_2$O—, —OCF$_2$—, or —CF$_2$O—.

Each of $m^{11}$ to $m^{31}$ independently represents an integer from 0 to 3.

Each of $X^{11}$ and $X^{12}$ independently represents —H, —Cl, or —F.

$Y^{11}$ represents —CN, —F, —OCHF$_2$, —CF$_3$, —OCF$_3$, or an alkyl group, alkoxy group, alkenyl group, or alkenyloxy group having 2 to 5 carbon atoms.

In addition, the optical responses of the liquid crystal layers 23 and 33 are favorably or unfavorably affected by the alignment layers 24$a$, 24$b$, 34$a$, and 34$b$. Therefore, for the alignment layers 24$a$, 24$b$, 34$a$, and 34$b$, a material having a relatively large anchoring energy with the liquid crystal layers 23 and 33 is preferably used, and specifically, at least one material selected from a polyimide (PI), a polyamide, chalcone, cinnamate, and cinnamoyl is preferably used.

EXAMPLES

Hereinafter, the effect of the present invention will be further clarified using examples. Meanwhile, the present invention is not limited to the following examples and can be appropriately modified and carried out within the scope of the main concept of the present invention.

Figure 3:
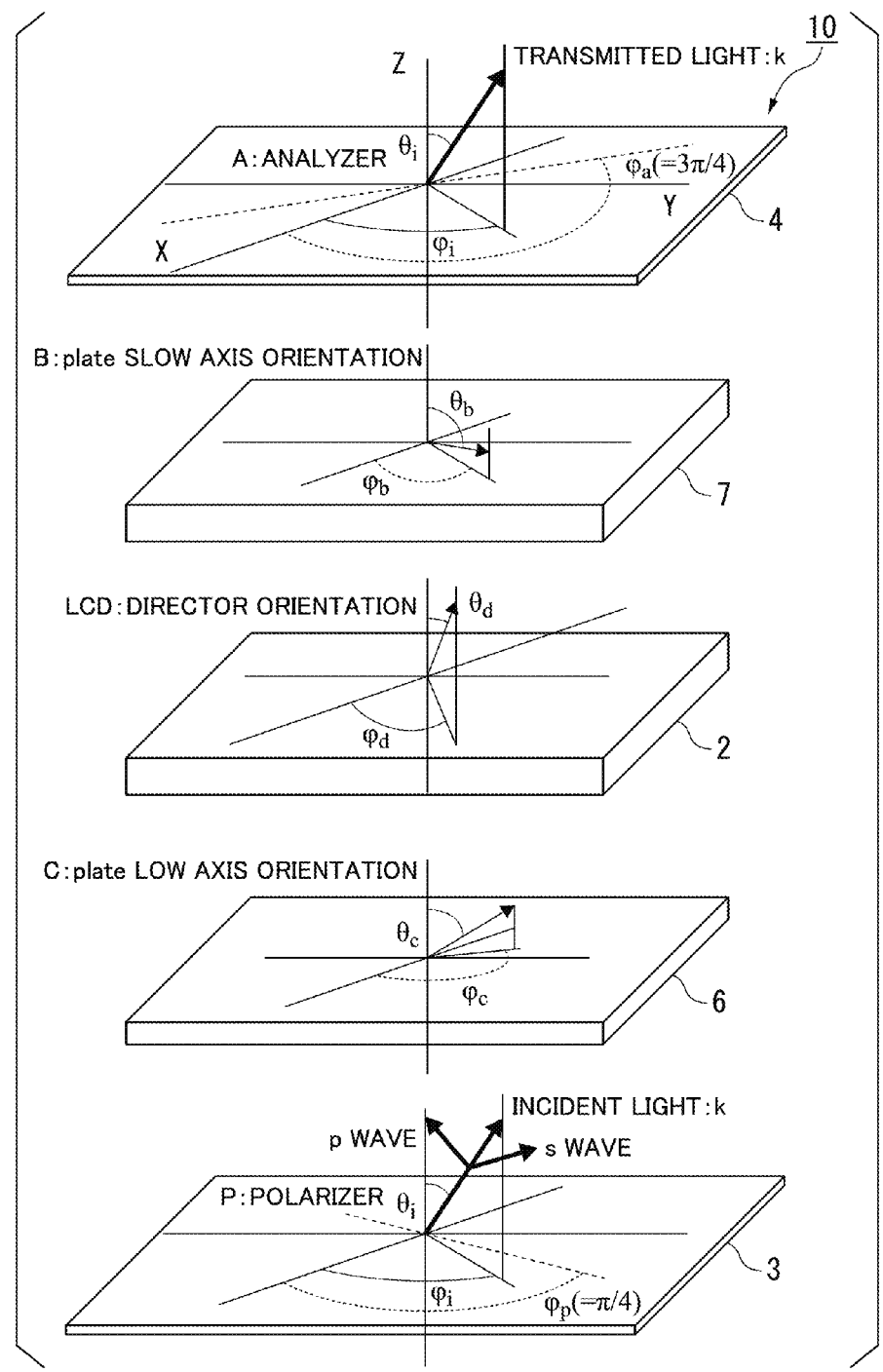
FIG. 3 is a schematic view showing another example of optical dispositions in individual sections constituting a liquid crystal optical element.

In the present examples, first, an ordinary method for improving the optical response of a liquid crystal display device to which the present invention is applied will be described with reference to FIGS. 3 and 4. Meanwhile, FIG. 3 is a schematic view showing optical dispositions of individual sections constituting a liquid crystal optical element 10. FIG. 2 is a schematic view showing optical dispositions in a case in which retarders (optical compensation plates) 6 and 7 are not disposed in the liquid crystal optical element 10 shown in FIG. 4.

As shown in FIG. 3, schematically, the liquid crystal optical element 10 includes the liquid crystal cell 2, the first polarization plate 3, the second polarization plate 4, a first retarder 6, and a second retarder 7. In addition, in the liquid crystal optical element 10, the first retarder 6 is disposed between the liquid crystal cell 2 and the first polarization plate 3, and the second retarder 7 is disposed between the liquid crystal cell 2 and the second polarization plate 4.

The constitution of the liquid crystal optical element other than what has been described above is basically the same as that of the liquid crystal optical element 1 shown in FIG. 1. Therefore, in the liquid crystal optical element 10 shown in FIG. 3, sections equivalent to those of the liquid crystal optical element 1 shown in FIG. 1 will not be described again and will be given the same reference sign in the drawings.

Figure 4:
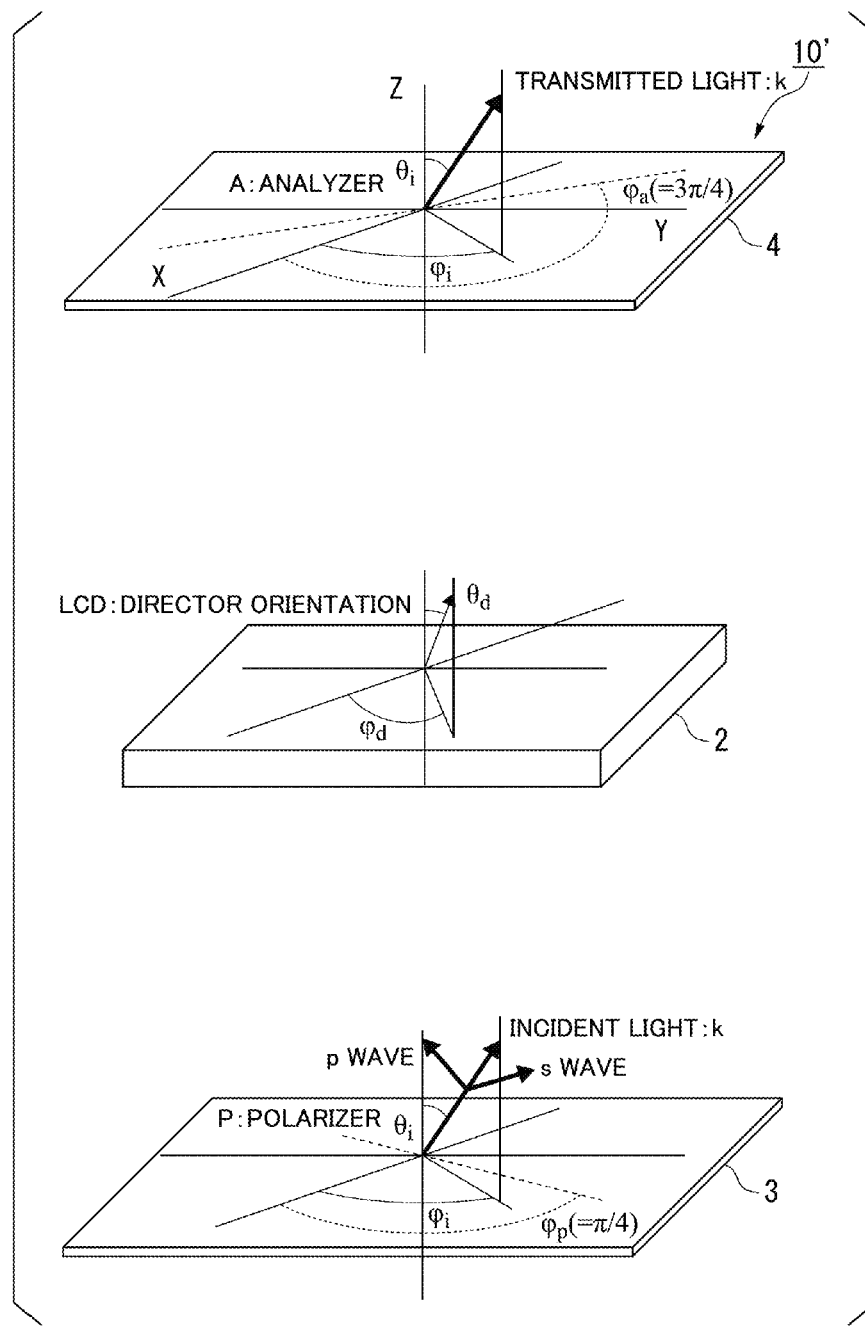
FIG. 4 is a schematic view in a case in which a retarder is not disposed in the liquid crystal optical element shown in FIG. 3.

In addition, a liquid crystal optical element 10' that is the liquid crystal optical element 10 shown in FIG. 3 in which the first retarder 6 and the second retarder 7 are not disposed is shown in FIG. 4.

In the present example, while the transmission axes of the first polarization plate 3 and the second polarization plate 4 have a positional relationship of being orthogonal to each other when seen in a normal direction, the first polarization plate 3 and the second polarization plate 4 may be disposed arbitrarily. In addition, incident light with a wavelength k is incident on the liquid crystal optical elements 10 and 10' shown in FIGS. 3 and 4 in an arbitrary direction with respect to the vertical direction (a direction parallel to the Z axis) from the rear surface sides of the respective liquid crystal cells 2.

Here, since there are no mathematical expressions of the amounts of transmitted light $I_1$ and $I_2$ in a case in which the first polarization plate 3 and the second polarization plate 4 are arbitrarily disposed, a formula relative to Expression (1) is derived using the strokes vector, the extended Jones matrix, the extended Mueller matrix, or the like, and a method for calculating the amounts of transmitted light $I_1$ and $I_2$ that are applicable to the present invention will be described.

In the following description, coordinate axes and the like will be defined using cases shown in FIGS. 3 and 4 as examples, and calculations will be carried out. In addition, in the following description, with an assumption that scattering, reflection, attenuation, and the like are slight in individual interfaces, calculations will be carried out in an approximation of the dynamic matrix (J. Opt. Soc. Am. Vol. 72, No. 4, p. 507 (1982)).

First, the polarization state of light incident on an optical isomer is expressed using the extended Jones matrix (Jo) of Expression 6a. In addition, in the extended Mueller matrix (Mu), the polarization state thereof is expressed using Expression 6b below.

In addition, when the incident light strokes vector S is represented by Expression 6c below, the transmitted light strokes vector S' is represented by Expression 6d below, the polarizer matrix is represented by P, and the analyzer matrix is represented by A, the amount of transmitted light becomes the component S0' in the transmitted light strokes vector S' on the basis of a relationship of Expression 6e below.

$$Jo(\Gamma, \Psi) = \begin{pmatrix} \cos\Psi & -\sin\Psi \\ \sin\Psi & \cos\Psi \end{pmatrix} \begin{pmatrix} \exp(i\Gamma/2) & 0 \\ 0 & \exp(-i\Gamma/2) \end{pmatrix} \begin{pmatrix} \cos\Psi & \sin\Psi \\ -\sin\Psi & \cos\Psi \end{pmatrix} \quad \text{Expression 6a}$$

$$Mu(\Gamma, \Psi) = \begin{pmatrix} 1 & 0 & 0 & 0 \\ 0 & (\cos^2 2\Psi + \cos\Gamma\sin^2 2\Psi) & (1-\cos\Gamma)\sin 2\Psi\cos 2\Psi & \sin\Gamma\sin 2\Psi \\ 0 & (1-\cos\Gamma)\sin 2\Psi\cos 2\Psi & \sin^2 2\Psi + \cos\Gamma\cos^2 2\Psi & -\sin\Gamma\cos 2\Psi \\ 0 & -\sin\Gamma\sin 2 & \sin\Gamma\cos 2\Psi & \cos\Gamma \end{pmatrix} \quad \text{Expression 6b}$$

$$S = \begin{pmatrix} S0 \\ S1 \\ S2 \\ S3 \end{pmatrix} \quad \text{Expression 6c}$$

$$S' = \begin{pmatrix} S0' \\ S1' \\ S2' \\ S3' \end{pmatrix}$$

$$S' = AM\mu PS$$

Figure 5A:
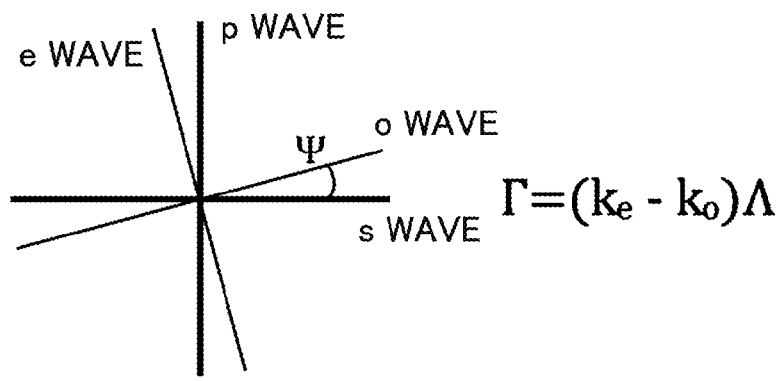
FIG. 5A is a schematic view showing an optical amount corresponding to light incident on a uniaxial optical isomer.
Figure 5B:
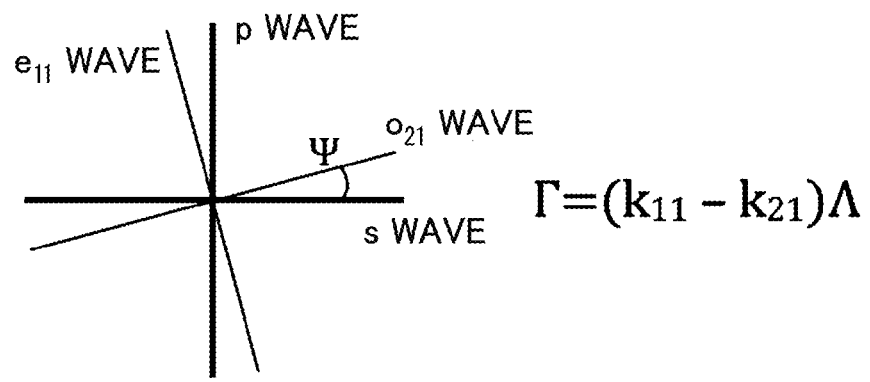
FIG. 5B is a schematic view showing an optical amount corresponding to light incident on a biaxial optical isomer.

Here, the optic axis alignment ψ and the phase alignment Γ in Expressions 6a and 6b are optical quantities corresponding to light incident on an optical isomer as shown in FIGS. 5A and 5B. Therefore, when formulae of the optic axis rotation angle ψ and the phase rotation angle Γ which are arbitrarily disposed are obtained, it is possible to consider the amount of transmitted light. Meanwhile, FIG. 5A shows a case in which light is incident on a uniaxial optical isomer. FIG. 5B shows a case in which light is incident on a biaxial optical isomer.

Next, the following X-Y coordinate system (Expressions 7a and 7b) is applied to the polarization plate, and the normal direction to the polarization plate is considered as the Z axis (Expression 7c). The absorption axis of the first polarization plate 3 is considered as the polarizer vector P, the transmission axis of the second polarization plate 4 is considered as the analyzer vector A, and the following X-Y coordinate system (Expressions 8a and 8b) is applied thereto. Incident light having a polar angle θi, an angle of alignment φI, and a wavelength k is expressed using Expression 7d as the incident light vector k.

The s wave of the incident light is defined using Expression 9, and the o wave of light transmitted through the polarization plate is defined using Expressions 10a and 11a. Therefore, in the case of the polarizer, the rotation angle ψ used in the Mueller matrix of the polarization plate is obtained using Expressions 10b and 10c, and in the case of the analyzer, the rotation angle is obtained using Expressions 11b and 11c.

Therefore, individual Mueller matrixes of the polarizer and the analyzer are expressed using Expressions 12a and 12b and Expressions 13a to 13c below. Therefore, a formula relative to light (θi, φi) incident on an arbitrarily-disposed polarization plate (φp, φa) in an arbitrary direction can be obtained.

$X = (1\ 0\ 0)$  Expression 7a $Y = (0\ 1\ 0)$  Expression 7b $Z = (0\ 0\ 1)$  Expression 7c $k = k(\sin\theta_i\cos\varphi_i\ \sin\theta_i\sin\varphi_i\ \cos\theta_i)$  Expression 7d $P = (\cos\varphi_p\ \sin\varphi_p\ 0)$  Expression 8a $A = (\cos\varphi_a\ \sin\varphi_a\ 0)$  Expression 8b $s = Zxk/|Zxk| = (-\sin\varphi_i\ \cos\varphi_a\ 0)$  Expression 9

$o_p = Pxk/|Pxk|$  Expression 10a $\cos\Psi_p = o_p \cdot s/|o_p|\ |s| = -\cos(\varphi_i - \varphi_p)\cos\theta_i/|Pxk|$  Expression 10b $\sin\Psi_p = |o_p xs|/|o_p|\ |s| = -\sin(\varphi_i - \varphi_p)/|Pxk|$  Expression 10c $o_a = Axk/|Axk|$  Expression 11a $\cos\Psi_a = o_a \cdot s/|o_a|\ |s| = -\cos(\varphi_i - \varphi_a)\cos\theta_i/|Axk|$  Expression 11b $\sin\Psi_a = |o_a xs|/|o_a|\ |s| = -\sin(\varphi_i - \varphi_a)/|Axk|$  Expression 11c $$P = \begin{pmatrix} 1 & \cos2\Psi_p & \sin2\Psi_p & 0 \\ \cos2\Psi_p & (\cos2\Psi_p)^2 & \sin2\Psi_p\cos2\Psi_p & 0 \\ \sin2\Psi_p & \sin2\Psi_p\cos2\Psi_p & (\sin2\Psi_p)^2 & 0 \\ 0 & 0 & 0 & 0 \end{pmatrix} =$$  Expression 12a $$\begin{pmatrix} 1 & p12 & p13 & 0 \\ p21 & p22 & p23 & 0 \\ p31 & p32 & p33 & 0 \\ 0 & 0 & 0 & 0 \end{pmatrix}$$

$\cos2\Psi_p = \dfrac{\cos^2\theta_i \cdot \cos^2(\varphi_i - \varphi_p) - \sin^2(\varphi_i - \varphi_p)}{\cos^2\theta_i + \sin^2\theta i \cdot \sin^2(\varphi_i - \varphi_p)}$  Expression 12b $\sin2\Psi_p = \dfrac{\cos\theta_i \cdot \sin2(\varphi_i - \varphi_p)}{\cos^2\theta_i + \sin^2\theta i \cdot \sin^2(\varphi_i - \varphi_p)}$  Expression 12c $$A = \begin{pmatrix} 1 & \cos2\Psi_a & \sin2\Psi_a & 0 \\ \cos2\Psi_a & (\cos2\Psi_a)^2 & \sin2\Psi_a\cos2\Psi_a & 0 \\ \sin2\Psi_a & \sin2\Psi_a\cos2\Psi_a & (\sin2\Psi_a)^2 & 0 \\ 0 & 0 & 0 & 0 \end{pmatrix} =$$  Expression 13a $$\begin{pmatrix} 1 & a12 & a13 & 0 \\ a21 & a22 & a23 & 0 \\ a31 & a32 & a33 & 0 \\ 0 & 0 & 0 & 0 \end{pmatrix}$$

$\cos2\Psi_a = \dfrac{\cos^2\theta_i \cdot \cos^2(\varphi_i - \varphi_a) - \sin^2(\varphi_i - \varphi_a)}{\cos^2\theta_i + \sin^2\theta i \cdot \sin^2(\varphi_i - \varphi_a)}$  Expression 13b $\sin2\Psi_a = \dfrac{\cos\theta_i \cdot \sin2(\varphi_i - \varphi_a)}{\cos^2\theta_i + \sin^2\theta i \cdot \sin^2(\varphi_i - \varphi_a)}$  Expression 13c Next, the Mueller matrix in each optical isomer of the first retarder 6 (the position of the optical axis: polar angle θc, rotation angle φc, refractive index: ne$^c$, no$^c$, thickness: Λc), the liquid crystal layer in the liquid crystal cell 2 (the position of the optical axis: polar angle θd, angle of orientation φd, refractive index: ned, nod, thickness: Λd), and the second retarder 7 (the position of the optical axis: polar angle θb, angle of orientation φb, refractive index: neb, nob, thickness: Λb) is derived by denoting a part of the same calculation process as 'j' instead of parameters 'b', 'd', and 'c'.

The main axis-based coordinate system abc of the optical isomer with respect to the X-Y-Z coordinate system is defined using Expressions 14a to 14c.

The incident light vector k is divided into two parts, that is, Expressions 15a and 15b below since the incident light refracts and propagates in the optical isomer according to Snell's law (the component in the Z-axis direction changes).

Here, in a case in which |ne−no|<ne, no, nz and |ne—nz|<ne, no, nz, since Expression 16a can be approximated (J.

Opt. Soc. Am. Vol. 72, No. 4, p. 507 (1982)), the of wave in the optical isomer can be expressed using Expression 16b.

The optic axis rotation angle ψj in the Mueller matrix of the optical isomer is obtained as Expressions 18a and 18b below from Expressions 17a and 17b obtained by applying and transforming the formulae of the inner product and outer product of the vector.

$$a_j = b_j x c_j / |b_j x c_j| = (\cos\theta_j \cos\varphi_j \quad \cos\theta_j \sin\varphi_j \quad -\sin\theta_j)$$  Expression 14a $$b_j = Z x c_j / |Z x c_j| = (-\sin\varphi_j \quad \cos\varphi_j \quad 0)$$  Expression 14b $$c_j = (\sin\theta_j \cos\varphi_j \quad \sin\theta_j \sin\varphi_j \quad \cos\theta_j)$$  Expression 14c $$k_o^j = (k\sin\theta_i \cos\varphi_i \quad k\sin\theta_i \sin\varphi_i \quad k_{oz}^j)$$  Expression 15a $$k_e^j = (k\sin\theta_i \cos\varphi_i \quad k\sin\theta_i \sin\varphi_i \quad k_{ez}^j)$$  Expression 15b $$k_o^j = k_e^j$$  Expression 16a $$o_j = c_j x k_o^j / |c_j x k_o^j|$$  Expression 16b $$o_j x s(s \cdot c_j) k_o^j / |c_j x k_o^j|$$  Expression 17a $$s \cdot o_j = \{-(k_o^j \cdot Z)(c^j \cdot k) + (k_o^j \cdot k)(c_j \cdot Z)\} / |c_j x k_o^j| |Z x k|$$  Expression 17b $$\cos\Psi_j = o_j \cdot s / |o_j| |s|$$  Expression 18a
$$= \{-k_{oz}^j \sin\theta_j \cdot \cos(\varphi_i - \varphi_j) + k\sin\theta_i \cdot \cos\theta_j\} / |c_j x k_o^j|$$

$$\sin\Psi_j = |o_j x s| / |o_j| |s|$$  Expression 18b
$$= -\sin\theta_j \cdot \sin(\varphi_i - \varphi_j) |k_o^j| / |c_j x k_o^j|$$

Next, vectors koz$^j$ and kez$^j$ are obtained. Specifically, in a case in which incident light is incident on an optical isomer in the a-b-c coordinate system, Expressions 19a and 19b are replaced into an equation obtained from the Maxwell equation of Expression 19c. In addition, it becomes equivalent to solve an intrinsic value problem of a simultaneous equation represented by Expression 19d derived therefrom. A solution meaning that an electric field E is not zero is obtained by solving an equation F of Expression 20a below.

Here, vectors (ka$^j$, kb$^j$, and kc$^j$) are components of a vector ke$^j$ in the a-b-c coordinate system. Coordinate transformation of this vector to the X-Y-Z coordinate system is represented by Expression 20b. That is, when the transformation expression of Expression 20b below is replaced into Expression 20a below, Equation F becomes a biquadratic equation of kez$^j$. Meanwhile, ω, ∈a$_j$, ∈b$_j$, and ∈c$_j$ have relationships of Expressions 20c to 20e.

In a case in which Na, Nb, and Nc are all equal to each other as in Expression 21a below, the solution becomes a quadruple root of Expression 21b below, there is no kez$^j$, and there is only an optical isomer of koz$^j$ represented by Expression 24c below.

For example, in a case in which two of Na, Nb, and Nc are equal to each other, and the remaining one is different therefrom as in Expression 22a, factorization is possible as in Expression 22b below, and thus the multiple root of koz$^j$ and the positive and negative double root of kez$^j$ are obtained.

A negative kez$^j$ optically means that a path of light is in a reverse direction, and thus positive kez$^j$ and koz$^j$ form a uniaxial optical isomer relative to refracted light. In this case, koz$^j$ is represented by Expression 24c below. The root of kezj is represented by Expression 24b below from the quadratic equation of Expression 23a below. Therefore, the phase rotation angle Γj used in the Mueller matrix becomes Expression 24a.

$$E_j = A_j \exp(i(\omega t - k_j \cdot r))$$  Expression 19a $$D_j = \begin{pmatrix} \varepsilon a_j & 0 & 0 \\ 0 & \varepsilon b_j & 0 \\ 0 & 0 & \varepsilon c_j \end{pmatrix} E_j$$  Expression 19b $$\partial^2 D_j / \partial t^2 - V^2 E_j = 0$$  Expression 19c $$\begin{pmatrix} \omega^2 \varepsilon a_j - k_{bj}^2 - k_{cj}^2 & k_{aj}k_{bj} & k_{aj}k_{cj} \\ k_{bj}k_{aj} & \omega^2 \varepsilon b_j - k_{cj}^2 - k_{aj}^2 & k_{bj}k_{cj} \\ k_{cj}k_{aj} & k_{cj}k_{bj} & \omega^2 \varepsilon c_j - k_{aj}^2 - k_{bj}^2 \end{pmatrix}$$  Expression 19d $$\begin{pmatrix} Ea \\ Eb \\ Ec \end{pmatrix} = 0$$

$$F = Na(k_{aj})^4 + Nb(k_{bj})^4 + Nc(k_{cj})^4 + (Nb + Nc)(k_{bj}k_{cj})^2 +$$  Expression 20a
$$(Nc + Na)(k_{cj}k_{aj})^2 + (Na + Nb)(k_{aj}k_{bj})^2 -$$
$$Na(Nb + Nc)(k_{aj})^2 - Nb(Nc + Na)(k_{bj})^2 -$$
$$Nc(Na + Nb)(k_{cj})^2 + NaNbNc = 0$$

$$k_e^{jabc} = (k_{aj} \quad k_{bj} \quad k_{cj})$$  Expression 20b
$$= (k_e^j \cdot a_j / |a_j| \quad k_e^j \cdot b_j / |b_j| \quad k_e^j \cdot c_j / |c_j|)$$
$$= (k\sin\theta_i \cos(\varphi_i - \varphi_j) \cos\theta_j - k_{ez}^j \sin\theta_j$$
$$k\sin\theta_i \sin(\varphi_i - \varphi_j)$$
$$k\sin\theta_i \cos(\varphi_i - \varphi_j)\sin\theta_j + k_{ez}^j \cos\theta_j)$$

$$Na = \omega^2 \varepsilon a_j = (nak)^2$$  Expression 20c $$Nb = \omega^2 \varepsilon b_j = (nbk)^2$$  Expression 20d $$Nc = \omega^2 \varepsilon c_j = (nck)^2$$  Expression 20e $$Na = Nb = Nc = (n_o^j k)^2$$  Expression 21a $$F = \{k_{aj}^2 + k_{bj}^2 + k_{cj}^2 - (n_o^j k)^2\}^2 = 0$$  Expression 21b $$Na = Nb = (n_o^j k)^2 \quad Nc = (n_e^j k)^2$$  Expression 22a $$F = \{k_{aj}^2 + k_{bj}^2 + k_{cj}^2 - (n_o^j k)^2\}^2$$  Expression 22b
$$\{(n_o^j k k_{aj})^2 + (n_o^j k k_{bj})^2 + (n_e^j k k_{cj})^2 - (n_o^j n_e^j k^2)^2\}$$

$$(n_o^j k k_{aj})^2 + (n_o^j k k_{bj})^2 + (n_e^j k k_{cj})^2 - (n_o^j n_e^j k^2)^2 =$$  Expression 23a
$$u(k_{ez}^j)^2 - v(k_{ez}^j) + w = 0$$

$$u = \frac{\sin^2\theta_j}{n_e^{j2}} + \frac{\cos^2\theta_j}{n_o^{j2}}$$  Expression 23b $$v = k\sin\theta i \cdot \cos(\varphi_i - \varphi_j)\sin 2\theta_j \left(\frac{1}{n_e^{j2}} - \frac{1}{n_o^{j2}}\right)$$  Expression 23c $$w = k^2 \sin^2\theta_i \left(\frac{\cos^2\theta_j \cos^2(\varphi_i - \varphi_j) + \sin^2(\varphi_i - \varphi_j)}{n_e^{j2}} + \frac{\cos^2(\varphi_i - \varphi_j)\sin^2\theta_j}{n_o^{j2}} \cdot k^2\right)$$  Expression 23d $$\Gamma_j = (k_{ez}^j - k_{oz}^j)\Lambda_j$$  Expression 24a $$k_{ez}^j = \{v + (v^2 - 4uw)^{1/2}\}/2u$$  Expression 24b $$k_{oz}^j = k(n_o^{j2} - \sin^2\theta_i)^{1/2}$$  Expression 24c In a case in which Na, Nb, and Nc are all different from each other as in Expression 25a below, Equation F becomes a biquadratic equation of kez$^j$. Here, description will be made using a biquadratic equation of Expression 25c obtained by arranging Expression 20a under a condition of Expression 25b below.

In a case in which the root of Expression 25c is an imaginary number, this optically means that the root corresponds to attenuation of light and thus this case will not be taken into account. In a case in which the equation of Expression 25c has four real roots, two positive roots ($k11^j$ and $k21^j$) and two negative roots ($k12^j$ and $k22^j$) are obtained from Expression 25d below.

The negative root optically means that, similar to what has been described above, a path of light is in a reverse direction, and thus positive $k11^j$ and $k21^j$ form a biaxial optical isomer relative to refracted light. Therefore, the phase rotation angle r becomes Expression 25e below.

Furthermore, when an approximation of Expression 26a below is applied to the equation of Expression 25c in order to reflect the fact that "the difference between the products of refractive indexes becomes a small quantity through cancellation of significant digits", $k11^j$ and $k21^j$ can be transformed to a more convenient formula. The phase rotation angle $\Gamma^j$ at this time becomes Expression 26c below.

Next, the optic axis rotation angle $\psi^j$ in a biaxial optical isomer is obtained in the following manner. That is, since the two positive roots ($k11^j$ and $k21^j$) are intrinsic values of Expression 19d below, the vector component ratio between electric field vectors Eabc (Ea, Eb, and Ec) corresponding to the intrinsic values can be calculated using Expression 26d below to which Cramer's rule is applied (a-b-c coordinate system-based expression).

An electric field vector Eabc ($k11^j$) and an electric field vector Eabc ($k21^j$) are mathematically intrinsic vectors of Expression (1) 9d, and thus both vectors have an orthogonal relationship (the inner product is zero).

Therefore, an e wave refracted at $k11^j$ (expressed as eabc) and a wave refracted at $k21^j$ correspond to an o wave (expressed as oabc).

The vector component ratio between oXYZ waves expressed using the X-Y-Z coordinate system is obtained from Expression 26e obtained by multiplying a rotation matrix (rotation around the Z axis) in which $\theta^j=0$ and $\phi^j$ are used as Euler angles by an oabc wave vector component. Therefore, the rotation angle $\psi^j$ can be obtained from Expression 26f using relational expressions of Expressions 26g to 26j. As a result, the extended Mueller matrixes of phase difference films B and C that are arbitrarily disposed or individual optical isomers in a liquid crystal panel LCD can be derived. When the extended Mueller matrix of a uniaxial optical isomer is transcribed again, Expressions 27 to 28e are obtained.

[Equation 8]

$$Na \neq Nb \neq Nc \quad \text{Expression 25a}$$

$$\theta_i = 0° \quad \text{Expression 25b}$$

$$F = Nc(k_{ez}^j)^4 + [(Na\cos^2(\varphi_i - \varphi_j) + Nb\sin^2(\varphi_i - \varphi_j) + Nc)k^2\sin^2\theta_i - Nc(Na + Nb)](k_{ez}^j)^2 +$$
$$\{Na\cos^2(\varphi_i - \varphi_j) + Nb\sin^2(\varphi_i - \varphi_j)\}$$
$$k^4\sin^4\theta_i - [NaNb + Nc(Na\cos^2(\varphi_i - \varphi_j) + Nb\sin^2(\varphi_i - \varphi_j))]k^2\sin^2\theta_i + NaNbNc$$
$$= U(k_{ez}^j)^4 - V(k_{ez}^j)^2 + W = 0 \quad \text{Expression 25c}$$

$$(k_{ez}^j)^2 = \{V \pm (V^2 - 4UW)^{1/2}\}/2U \quad \text{Expression 25d}$$

$$\Gamma_i = (k11 - k21)\Lambda_j$$
$$= [\{V + (V^2 - 4UW)^{1/2}\}^{1/2} - \{V + (V^2 - 4UW)^{1/2}\}^{1/2}]$$
$$\Lambda_i/2U \quad \text{Expression 25e}$$

$$NaNb + Nc^2 - NaNc + NbNc \cong 0 \quad \text{Expression 26a}$$

$$Na = (n_e^j k)^2 \quad Nb = (n_o^j k)^2 \quad Nc = (n_z^j k)^2 \quad \text{Expression 26b}$$

$$\Gamma_j = (k11 - k21)\Lambda_j$$
$$= k\Lambda_j \left[ n_e^j \sqrt{1 - \left(\frac{\sin^2(\varphi_i - \varphi_j)}{n_e^{j2}} + \frac{\cos^2(\varphi_i - \varphi_j)}{n_z^{j2}}\right)\sin^2\theta i} - n_o^j \sqrt{1 - \left(\frac{\sin^2(\varphi_i - \varphi_j)}{n_z^{j2}} + \frac{\cos^2(\varphi_i - \varphi_j)}{n_o^{j2}}\right)\sin^2\theta i} \right] \quad \text{Expression 26c}$$

$$E_{abc} \propto \begin{pmatrix} \begin{vmatrix} Nb - k_{cj}^2 - k_{aj}^2 & k_{bj}k_{cj} \\ k_{cj}k_{bj} & Nc - k_{aj}^2 - k_{bj}^2 \end{vmatrix} \\ \begin{vmatrix} k_{bj}k_{aj} & k_{bj}k_{cj} \\ k_{cj}k_{aj} & Nc_j - k_{aj}^2 - k_{bj}^2 \end{vmatrix} \\ \begin{vmatrix} k_{bj}k_{aj} & Nb - k_{cj}^2 - k_{aj}^2 \\ k_{cj}k_{aj} & k_{cj}k_{bj} \end{vmatrix} \end{pmatrix} \propto$$

Expression 26d $$\begin{pmatrix} k_{aj}/(k_{aj}^2 + k_{bj}^2 + k_{cj}^2 - Na) \\ k_{bj}/(k_{aj}^2 + k_{bj}^2 + k_{cj}^2 - Nb) \\ k_{cj}/(k_{aj}^2 + k_{bj}^2 + k_{cj}^2 - Nc) \end{pmatrix} = o_{abc}$$

$$o_{XYZ} = \begin{pmatrix} \cos\varphi_j & -\sin\varphi_j & 0 \\ \sin\varphi_j & \cos\varphi_j & 0 \\ 0 & 0 & 1 \end{pmatrix} o_{abc} = \begin{pmatrix} k_{aj}\cos\varphi_j/(k_{aj}^2 + k_{bj}^2 + k_{cj}^2 - Na) - \\ k_{bj}\sin\varphi_j/(k_{aj}^2 + k_{bj}^2 + k_{cj}^2 - Nb) \\ k_{aj}\sin\varphi_j/(k_{aj}^2 + k_{bj}^2 + k_{cj}^2 - Na_j) + \\ k_{bj}\cos\varphi_j/(k_{aj}^2 + k_{bj}^2 + k_{cj}^2 - Nb) \\ k_{cj}/(k_{aj}^2 + k_{bj}^2 + k_{cj}^2 - Nc) \end{pmatrix}$$

Expression 26e $$\cos\Psi_j = o_{XYZ} \cdot s/|o_{XYZ}||s|$$

$$= \frac{\left[ 1/\left(k^2\sin^2\theta_i + (k_{ez}^j)^2 - (n_o^j k)^2\right) - \right]}{1/\left(k^2\sin^2\theta_i + (k_{ez}^j)^2 - (n_e^j k)^2\right)}$$

$$k\sin\theta_i\sin(\varphi_i - \varphi_j)\cos(\varphi_i - \varphi_j)/|o_{XYZ}|$$

Expression 26f $$|o_{XYZ}|^2 = k^2\sin^2\theta_i\cos^2(\varphi_i - \varphi_j)/\left(k^2\sin^2\theta_i + (k_{ez}^j)^2 - (n_e^j k)^2\right)^2 +$$
$$k^2\sin^2\theta_i\sin^2(\varphi_i - \varphi_j)/\left(k^2\sin^2\theta_i + (k_{ez}^j)^2 - (n_o^j k)^2\right)^2 +$$
$$(k_{ez}^j)^2/\left(k^2\sin^2\theta_i + (k_{ez}^j)^2 - (n_z^j k)^2\right)^2$$

Expression 26g $$k_e^j = (k_{aj} \quad k_{bj} \quad k_{cj}) = (k\sin\theta_i\cos(\varphi_i - \varphi_j) \quad k\sin\theta_i\sin(\varphi_i - \varphi_j) \quad k_{ez}^j)$$

Expression 26h $$k_{aj}^2 + k_{bj}^2 + k_{cj}^2 = k^2\sin^2\theta_i + (k_{ez}^j)^2$$

Expression 26i $$k_{ez}^j = k21$$

Expression 26j $$Mu(\Gamma_i, \Psi_j) = Mu(\theta_i, \varphi_i, \theta_j, \varphi_j, k, n_e^j, n_o^j, \Lambda_j)$$

Expression 27

$$= \begin{pmatrix} 1 & 0 & 0 & 0 \\ 0 & \cos^2 2\Psi_j + \cos\Gamma_j\sin^2 2\Psi_j & (1-\cos\Gamma_j)\sin 2\Psi_j\cos 2\Psi_j & \sin\Gamma_j\sin 2\Psi_j \\ 0 & (1-\cos\Gamma_j)\sin 2\Psi_j\cos 2\Psi_j & \sin^2 2\Psi_j + \cos\Gamma_j\cos^2 2\Psi_j & -\sin\Gamma_j\cos 2\Psi_j \\ 0 & -\sin\Gamma_j\sin 2\Psi_j & \sin\Gamma_j\cos 2\Psi_j & \cos\Gamma_j \end{pmatrix} =$$

Expression $$\begin{pmatrix} 1 & 0 & 0 & 0 \\ 0 & mu22 & mu23 & mu24 \\ 0 & mu32 & mu33 & mu34 \\ 0 & mu42 & mu43 & mu44 \end{pmatrix}$$

$$\cos 2\Psi_j = \frac{\begin{aligned} & (n_o^{j2} - \sin^2\theta_j)\sin^2\theta_j \\ & \cos^2(\varphi_i - \varphi_j) \cdot 2(n_e^{j2}\sin^2\theta_i)^{1/2} \\ & \sin\theta_j\cos(\varphi_i - \varphi_j)\sin\theta_i\cos\theta_j + \\ & \sin^2\theta_i\cos^2\theta_j - n_o^{j2}\sin^2\theta_j \cdot \sin^2(\varphi_i - \varphi_j) \end{aligned}}{\begin{aligned} & (n_o^{j2} - \sin^2\theta_i)\sin^2\theta_j - \\ & 2(n_o^{j2} - \sin^2\theta_i)^{1/2}\sin\theta_i\sin\theta_j\cos\theta_j\cos(\varphi_i - \varphi_j) + \\ & \sin^2\theta_i\cos^2\theta_j + \sin^2\theta_i\sin^2\theta_j\sin^2(\varphi_i - \varphi_j) \end{aligned}}$$

Expression 28a

-continued $$\sin 2\Psi_j = \frac{2n_o\{(n_o^{j2}\sin^2\theta_i)^{1/2}\sin\theta_j\cos(\varphi_i - \varphi_j) \cdot \sin\theta_i \cdot \cos\theta_j\}\sin^2\theta_j \cdot \sin^2(\varphi_i - \varphi_j)}{(n_o^{j2} - \sin^2\theta_i)\sin^2\theta_j - 2(n_o^{j2} - \sin^2\theta_i)^{1/2}\sin\theta_i\sin\theta_j\cos\theta_j\cos(\varphi_i - \varphi_j) + \sin^2\theta_i\cos^2\theta_j + \sin^2\theta_i\sin^2\theta_j\sin^2(\varphi_i - \varphi_j)}$$

Expression 28b $$k_{ez}^j = \frac{k\sin\theta i\cos(\varphi_i - \varphi_j)\sin 2\theta_j\left(\frac{1}{n_e^{j2}} - \frac{1}{n_o^{j2}}\right) + (u1 - u2)^{1/2}}{2\left(\frac{\sin^2\theta_j}{n_e^{j2}} + \frac{\cos^2\theta_i}{n_o^{j2}}\right)}$$

Expression 28c $$u1 = k^2\sin^2\theta i\cos^2(\varphi_i - \varphi_j)\sin^2 2\theta_j\left(\frac{1}{n_e^{j2}} - \frac{1}{n_o^{j2}}\right)^2$$

Expression 28d $$u2 = 4\left(\frac{\sin^2\theta_j}{n_e^{j2}} + \frac{\cos^2\theta_i}{n_o^{j2}}\right)\left\{k^2\sin^2\theta_i\left(\frac{\cos^2\theta_j\cos^2(\varphi_i - \varphi_j) + \sin^2(\varphi_i - \varphi_j)}{n_e^{j2}} + \frac{\cos^2(\varphi_i - \varphi_j)\sin^2\theta_j}{n_o^{j2}}\right) - k^2\right\}$$

Expression 28e

The extended Mueller matrix formulae of a uniaxial optical isomer and a biaxial optical isomer are obtained in the above-described manner, and an optical design satisfying Expression (1) is enabled using the above-described formulae.

Next, specific formulae of a uniaxial optical isomer will be shown in Table 1.

[Table 1]

| Abstract | Examples of a variety of Mueller matrixes and parameters thereof |
|---|---|
| For C-plate<br>With no application<br>For VA liquid crystal layer<br>Corresponding to $\theta_o = 0$<br>$\therefore \cos\Psi j = \cos 2\Psi j = 1$<br>$\sin\Psi j = \sin 2\Psi j = 0$ | $M(\theta i, \phi i, 0°, \phi j, k, nej, noj, \wedge j) = \begin{pmatrix} 1 & 0 & 0 & 0 \\ 0 & 1 & 0 & 0 \\ 0 & 0 & \cos\lceil j & -\sin\lceil j \\ 0 & 0 & \sin\lceil j & \cos\lceil j \end{pmatrix}$<br><br>$\lceil j = k \wedge \left\{\frac{no}{ne}(ne^2 - \sin^2\theta i)^{\frac{1}{2}} - (no^2 - \sin^2\theta i)^{\frac{1}{2}}\right\}$ |
| For A-plate<br>With no application<br>For IPS liquid crystal layer<br>Corresponding to $\theta j = 90°$<br>$\therefore \cos\theta j = 0$<br>$\sin\theta j = 1$ | $M(\theta i, \phi i, 90°, \phi j, k, nej, noj, \wedge j) = \begin{pmatrix} 1 & 0 & 0 & 0 \\ 0 & \cos^2 2\Psi_i + \cos\lceil_j\sin^2 2\Psi_j & (1 - \cos\lceil_j)\sin 2\Psi_j\cos 2\Psi_j & \sin\lceil_j\sin 2\Psi_j \\ 0 & (1 - \cos\lceil_j)\sin 2\Psi_j\cos 2\Psi_j & \sin^2 2\Psi_j + \cos\lceil_j\cos^2 2\Psi_j & -\sin\lceil_j\cos 2\Psi_j \\ 0 & -\sin\lceil_j\sin 2\Psi_j & \sin\lceil_j\cos 2\Psi_j & \cos\lceil j \end{pmatrix}$<br><br>$\cos 2\Psi j = k^2 noj^2\cos 2(\phi i - \phi j) - k^2\sin^2\theta i \cdot \cos^2(\phi i - \phi j)/|O|^2$<br>$\sin 2\Psi j = k^2 noj(noj^2 - \sin^2\theta i)^{1/2}\sin 2(\phi i - \phi j)/|O|^2$<br>$|O|^2 = k^2\{noj^2 - \sin^2\theta i \cdot \cos^2(\phi i - \phi j)\}$<br><br>$\lceil j = k \wedge \left[nej\left\{1 - \sin^2\theta_i \cdot \left(\frac{\sin^2(\phi_i - \phi_j)}{nej^2} + \frac{\cos^2(\phi_i - \phi_j)}{noj^2}\right)\right\}^{\frac{1}{2}} - (noj^2 - \sin^2\theta i)^{\frac{1}{2}}\right]$ |

-continued

| Abstract | Examples of a variety of Mueller matrixes and parameters thereof |
|---|---|
| For A-plate $\lambda/4$<br>Corresponding to $[j = \pi/2$<br>$\therefore \cos[j = 0$<br>$\sin[j = 1$ | $M(\theta i, \phi i, \theta j, \phi j, k, nej, noj, \Lambda j) = \begin{pmatrix} 1 & 0 & 0 & 0 \\ 0 & \cos^2 2\Psi_m & \sin 2\Psi_m \cos 2\Psi_m & \sin 2\Psi_m \\ 0 & \sin 2\Psi_m \cos 2\Psi_m & \sin^2 2\Psi_m & -\cos 2\Psi_m \\ 0 & -\sin 2\Psi_m & \cos 2\Psi_m & 0 \end{pmatrix}$<br><br>$\cos 2\Psi j = k^2 noj^2 \cos 2(\phi i - \phi j) - k^2 \sin^2\theta i \cdot \cos^2(\phi i - \phi j)/|O|^2$<br>$\sin 2\Psi j = k^2 noj(noj^2 - \sin^2\theta i)^{1/2}\sin 2(\phi i - \phi j)/|O|^2$<br>$|O|^2 = k^2\{noj^2 - \sin^2\theta i \cdot \cos^2(\phi i - \phi j)\}$<br>Here, one of independent variables ($\theta i, \phi i, \phi j, k, nej, noj, \Lambda j$) becomes a dependent variable under conditions satisfying functions in the following expression<br><br>$\pi/2 = k \wedge j\left[nej\{1 - \sin^2\theta_i \cdot \left(\frac{\sin^2(\phi_i - \phi_j)}{nej^2} + \frac{\cos^2(\phi_i - \phi_j)}{noj^2}\right)\}^{\frac{1}{2}} - (noj^2 - \sin^2\theta i)^{\frac{1}{2}}\right]$ |
| For vertical incident light<br>Corresponding to $\theta i = 0°$<br>$\therefore \cos\theta i = 1$<br>$\sin\theta i = 0$ | $M(0°, \phi i, \phi j, k, nej, noj, \wedge j) = \begin{pmatrix} 1 & 0 & 0 & 0 \\ 0 & \cos^2 2\Psi_i + \cos\lceil_i\sin^2 2\Psi_j & (1-\cos\lceil_j)\sin 2\Psi_j\cos 2\Psi_j & \sin\lceil_i\sin 2\Psi_i \\ 0 & (1-\cos\lceil_j)\sin 2\Psi_j\cos 2\Psi_j & \sin^2 2\Psi_j + \cos\lceil_j\cos^2 2\Psi_i & -\sin\lceil_i\cos 2\Psi_i \\ 0 & -\sin\lceil_j\sin 2\Psi_j & \sin\lceil_i\cos 2\Psi_i & \cos\lceil_j \end{pmatrix}$<br><br>$\cos 2\Psi j = \cos 2(\phi i - \phi_c)$<br>$\sin 2\Psi j = \sin 2(\phi i - \phi_c)$<br><br>$\lceil j = k \wedge j\left\{\left(\frac{\sin^2\theta_i}{nej^2} + \frac{\cos^2\theta_j}{noj^2}\right)^{-\frac{1}{2}} - noj\right\}$ |

In a case in which the respective optical isomers of the first retarder 6, the second retarder 7, and the liquid crystal cell 2 can be specifically designated like an A plate, a C plate, a $\lambda/4$ plate, a liquid crystal cell in a homogeneous alignment (ECB mode), a liquid crystal cell in a vertical alignment (VA mode), or the like, Table 1 can be used.

Supplementary, the difference between the A plate and the C plate is a difference in a method for specifying the parameters of the Mueller matrix. The difference between the ECB mode and the VA mode is a difference in a method for specifying $\theta d$. Therefore, the desired disposition becomes possible using only the method for specifying the parameters of the Mueller matrix.

In addition, regarding the difference between a uniaxial optical isomer and a biaxial optical isomer, when a relationship of $nz^d = no^d$ is replaced into Expressions 26c and 26f, Expression 24a into which $\theta j = 0$ is replaced and Expression (1) 8a are obtained, and thus, similarly, the desired disposition becomes possible using only the method for specifying the parameters of the Mueller matrix. Therefore, the amount of transmitted light for which the above-described expressions are used can be considered as a general theory.

Next, calculation of lamination, the amount of transmitted light, and temporal change will be described.

In the present examples, for the liquid crystal optical elements 10 and 10' shown in FIGS. 3 and 4, calculation proceeds on the basis of the following definitions.

First polarization plate 3 (axis position: orientation angle $\phi_p$)

First retarder 6 (axis: polar angle $\theta_c$, orientation angle $\theta_c$, refractive index: $ne^c ne_b$, $no^c$, thickness: $\Lambda_c$), Liquid crystal layer in liquid crystal cell 2 (axis: polar angle $\theta d$, orientation angle $\phi d$, refractive index: $ne^d$, $no^d$, thickness: $\Lambda d$), Second retarder 7 (axis: polar angle $\theta_b$, orientation angle $\phi_b$, refractive index: $ne^b$, $no^b$, thickness: $\Lambda_b$)

Second polarization plate 4 (axis position: orientation angle $\phi_a$)

When the respective Mueller matrices of the first retarder 6, the second retarder 7, and the liquid crystal cell 2 are expressed using Expressions 29a to 29c below, the product of these Mueller matrices becomes Expression 30 below. In addition, in a case in which the first retarder 6 is constituted with n retarders, Expression 31a below is used. Similarly, in a case in which the second retarder 7 is constituted with n retarders, Expression 31b below is used.

Furthermore, in a case in which the retarder is not disposed, for example, a case in which the second retarder 7 is not disposed, at $\theta_b = 0$ and $ne^b = no^b$, the Mueller matrix of Expression 29a below simply needs to be transformed to an identity matrix.

In a case in which natural light (unbiased light) is used as incident light, the stokes vector is expressed using Expression 30a below, and thus the amounts of transmitted light $I_1$ and $I_2$ of the liquid crystal optical elements 10 and 10' shown in FIGS. 3 and 4 become Expressions 32d and 32c below through calculation of Expression 32b below. In addition, temporal differentiations thereof and ratios thereof are obtained in forms of Expressions 32e to 32g below.

Meanwhile, in a case in which the optical response during a fall time (OFF) from a voltage V1 to a voltage V2 which have a magnitude relationship of V1>V2 is applied in an ECB mode and a VA mode, only $\theta d$ of the liquid crystal layer is $\theta d(V, t)$, and thus $\theta d(t)$ is used as an independent variable in Expressions 32e to 32g below.

$$B(\theta_1, \varphi_1, \theta_b, \varphi_b, k, n_e^b, n_o^b, \Lambda_b) = \begin{pmatrix} 1 & 0 & 0 & 0 \\ 0 & b22 & b23 & b24 \\ 0 & b32 & b33 & b34 \\ 0 & b42 & b43 & b44 \end{pmatrix} \quad \text{Expression 29a}$$

$$D(\theta_1, \varphi_1, \theta_d, \varphi_d, k, n_e^d, n_o^d, \Lambda_d) = \begin{pmatrix} 1 & 0 & 0 & 0 \\ 0 & d22 & d23 & d24 \\ 0 & d32 & d33 & d34 \\ 0 & d42 & d43 & d44 \end{pmatrix} \quad \text{Expression 29b}$$

$$C(\theta_1, \varphi_1, \theta_c, \varphi_c, k, n_e^c, n_o^c, \Lambda_c) = \begin{pmatrix} 1 & 0 & 0 & 0 \\ 0 & c22 & c23 & c24 \\ 0 & c32 & c33 & c34 \\ 0 & c42 & c43 & c44 \end{pmatrix} \quad \text{Expression 29c}$$

$$M = BDC = \begin{pmatrix} 1 & 0 & 0 & 0 \\ 0 & m22 & m23 & m24 \\ 0 & m32 & m33 & m34 \\ 0 & m42 & m43 & m44 \end{pmatrix} = \quad \text{Expression 30}$$

$$\begin{pmatrix} 1 & 0 & 0 & 0 \\ 0 & \begin{matrix} b22\Sigma d2ici2 + \\ b23\Sigma d3ici3 + \\ b24\Sigma d4ici2 \end{matrix} & \begin{matrix} b22\Sigma d2ici3 + \\ b23\Sigma d3ici3 + \\ b24\Sigma d4ici3 \end{matrix} & \begin{matrix} b22\Sigma d2ici4 + \\ b23\Sigma d3ici4 + \\ b24\Sigma d4ici4 \end{matrix} \\ 0 & \begin{matrix} b32\Sigma d2ici2 + \\ b33\Sigma d3ici3 + \\ b34\Sigma d4ici2 \end{matrix} & \begin{matrix} b32\Sigma d2ici3 + \\ b33\Sigma d3ici3 + \\ b34\Sigma d4ici3 \end{matrix} & \begin{matrix} b32\Sigma d2ici4 + \\ b33\Sigma d3ici4 + \\ b34\Sigma d4ici4 \end{matrix} \\ 0 & \begin{matrix} b42\Sigma d2ici2 + \\ b43\Sigma d3ici3 + \\ b44\Sigma d4ici2 \end{matrix} & \begin{matrix} b42\Sigma d2ici3 + \\ b43\Sigma d3ici3 + \\ b44\Sigma d4ici3 \end{matrix} & \begin{matrix} b42\Sigma d2ici4 + \\ b43\Sigma d3ici4 + \\ b44\Sigma d4ici4 \end{matrix} \end{pmatrix}$$

$$Bp = B^1(\Psi b^1, \Gamma b^1) \ldots B^k(\Psi b^k, \Gamma b^k) \ldots B^n(\Psi b^n, \Gamma b^n) = \quad \text{Expression 31a}$$

$$\begin{pmatrix} 1 & 0 & 0 & 0 \\ 0 & bp22 & bp23 & bp24 \\ 0 & bp32 & bp33 & bp34 \\ 0 & bp42 & bp43 & bp44 \end{pmatrix}$$

$$Cp = C^1(\Psi c^1, \Gamma c^1) \ldots C^k(\Psi c^k, \Gamma c^k) \ldots C^n(\Psi c^n, \Gamma c^n) = \quad \text{Expression 31b}$$

$$\begin{pmatrix} 1 & 0 & 0 & 0 \\ 0 & cp22 & cp23 & cp24 \\ 0 & cp32 & cp33 & cp34 \\ 0 & cp42 & cp43 & cp44 \end{pmatrix}$$

$$S = \begin{pmatrix} S0 \\ S1 \\ S2 \\ S2 \end{pmatrix} = \begin{pmatrix} 1 \\ 0 \\ 0 \\ 0 \end{pmatrix} \quad \text{Expression 32a}$$

$$S' = ABpDCpPS = AMP = \begin{pmatrix} 1 & a12 & a13 & 0 \\ a21 & a22 & a23 & 0 \\ a31 & a32 & a33 & 0 \\ 0 & 0 & 0 & 0 \end{pmatrix} \quad \text{Expression 32b}$$

$$\begin{pmatrix} 1 & 0 & 0 & 0 \\ 0 & m22 & m23 & m24 \\ 0 & m32 & m33 & m34 \\ 0 & m42 & m43 & m44 \end{pmatrix} \begin{pmatrix} 1 & p12 & p13 & 0 \\ p21 & p22 & p23 & 0 \\ p31 & p32 & p33 & 0 \\ 0 & 0 & 0 & 0 \end{pmatrix}$$

$$I_1 = SO'/SO = 1 + a12p21d22 + a12p31d23 + a13p21d32 + a13p31d33 \quad \text{Expression 32c}$$

$$I_2 = SO'/SO = 1 + a12p21m22 + a12p31m23 + a13p21m32 + a13p31m33 \quad \text{Expression 32d}$$

$$\frac{\partial}{\partial t} I_1(\theta_d) = \frac{\partial}{\partial \theta_d} I_1 \frac{\partial}{\partial t} \theta_d \quad \text{Expression 32e}$$

$$\frac{\partial}{\partial t} I_2(\theta_d) = \frac{\partial}{\partial \theta_d} I_2 \frac{\partial}{\partial t} \theta_d \quad \text{Expression 32f}$$

$$\frac{\frac{\partial}{\partial t} I_2(\theta_d)}{\frac{\partial}{\partial t} I_1(\theta_d)} = \frac{\frac{\partial}{\partial \theta_d} I_2}{\frac{\partial}{\partial \theta_d} I_1} \quad \text{Expression 32g}$$

[Conditions for Carrying Out Simulation]

Hereinafter, a variety of simulation results obtained using Expressions 32c to 32g will be exemplified, and a method for optical design using the present invention and usefulness of the present invention will be described.

Figure 6:
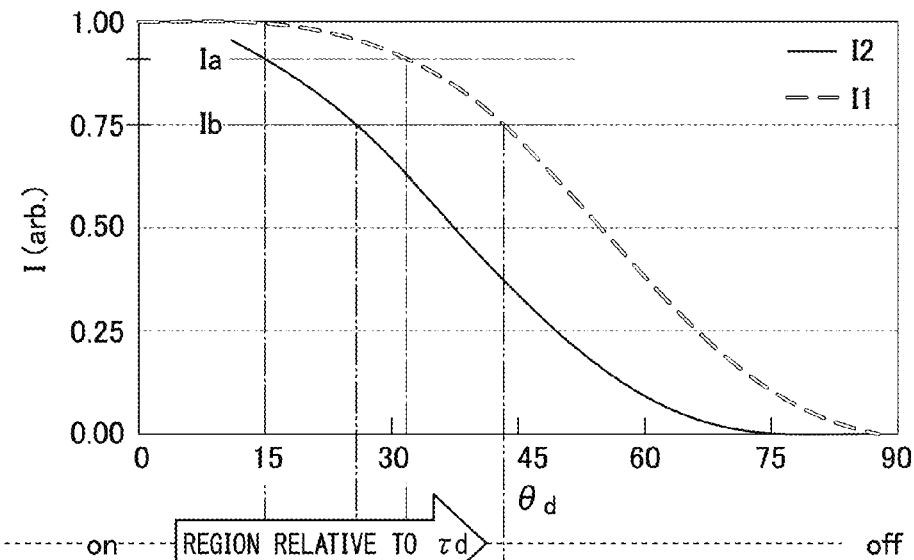
FIG. 6 shows graphs showing examples in which a method of the present invention is applied in the case of a horizontal alignment (HO).
Figure 6:
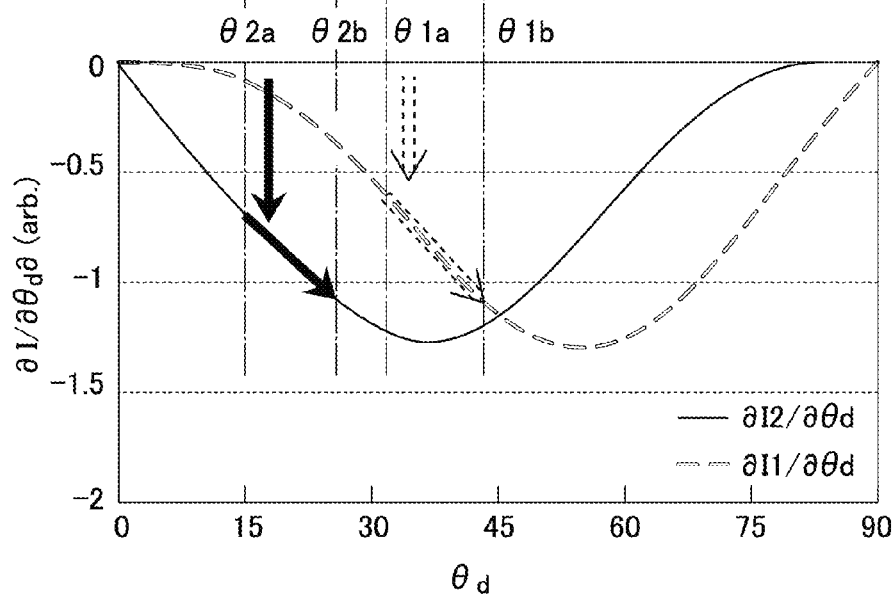
Figure 7:
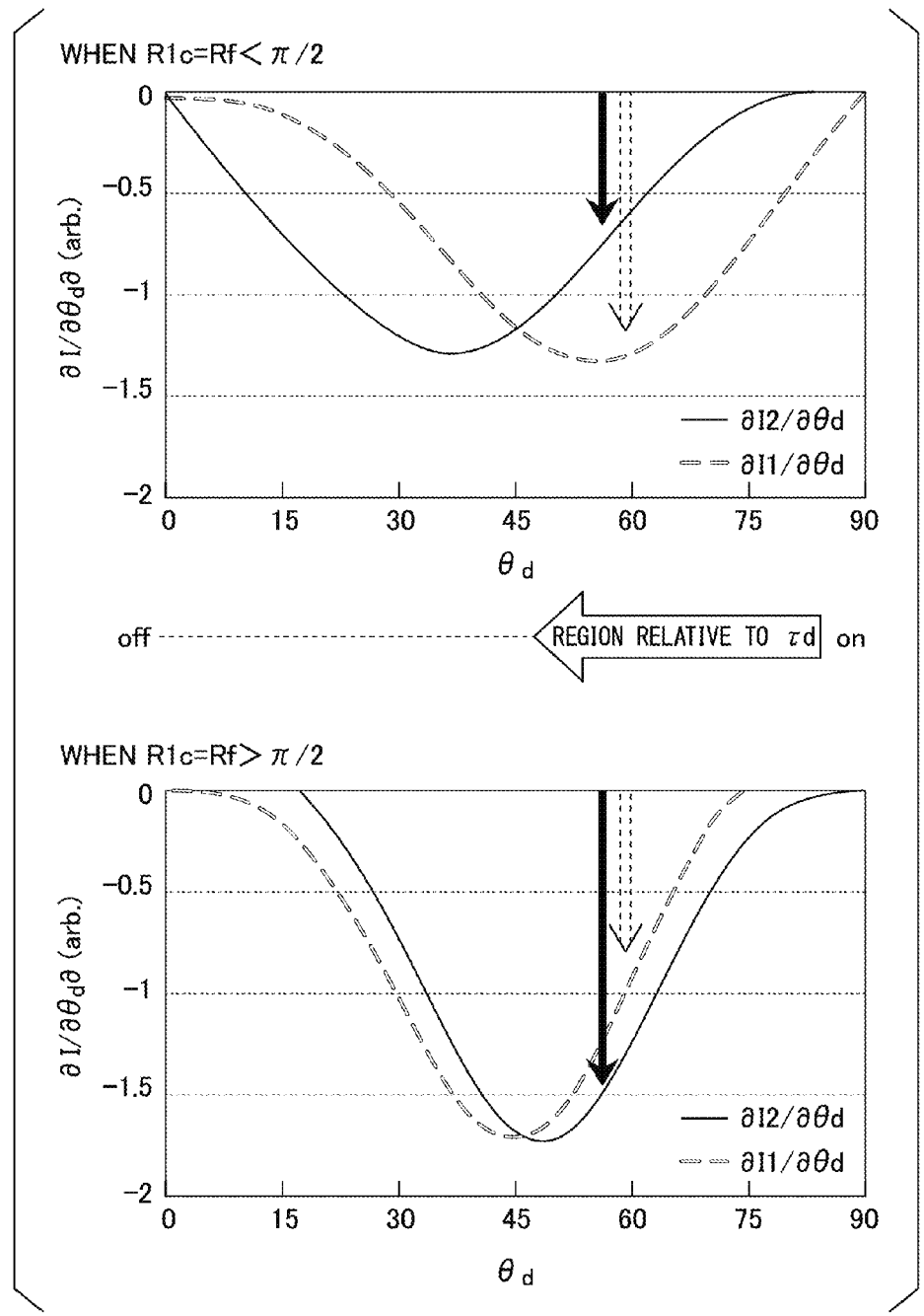
FIG. 7 shows graphs showing examples in which the method of the present invention is applied in the case of a vertical alignment (VA).

First, simulation results shown in FIGS. 6 and 7 are both examples in which the liquid crystal optical element 10 shown in FIG. 3 is used. In addition, a variety of conditions of the liquid crystal optical element 10 were set as described below.

Disposition of the first polarization plate 3 and the second polarization plate 4: (ϕp, ϕa)=(45°, 135°)

Disposition of the liquid crystal cell 2: (ϕd)=(0°)

Disposition of the first phase plate 6: (θc, ϕc)=(90°, 90°)

Disposition of the second phase plate 7: identity matrix

Meanwhile, an A plate is used as the first phase plate 6, and, with intention of simple description, the second phase plate 7 is not disposed (the Mueller matrix is transformed to an identity matrix).

FIG. 6 shows examples in a case in which the method of the present invention is applied in a case in which the alignment state of the liquid crystal layer is in a horizontal alignment (HO) when the driving voltage is not applied and shows the results of simulations in a case in which Expression (1) is applied under a condition of Rlc=Rf<π/2. Furthermore, in the upper part of FIG. 6, a relationship between the amount of transmitted light I and the polar angle θd is shown, and in the lower part of FIG. 6, a relationship between ∂I/∂θd and the polar angle θd is shown.

As shown in FIG. 6, when the driving voltage is sufficiently high (turned on), θd is 0°. On the other hand, when the driving voltage is 0 V (turned off), θd is 90°.

FIG. 7 shows examples in a case in which the alignment state of the liquid crystal layer is in a vertical alignment (VA) when the driving voltage is not applied and shows a relationship of ∂I/∂θd. Furthermore, in the upper part of FIG. 7, a simulation result of an optical condition (Rlc=Rf<π/2) not satisfying Expression (1) is shown, and in the lower part of FIG. 7, a simulation result of an optical condition (Rlc=Rf>π/2) satisfying Expression (1) is shown.

As shown in FIG. 7, when the driving voltage is sufficiently high (turned on), θd is 90°. On the other hand, when the driving voltage is 0 V (turned off), θd is 0°.

In addition, among the graphs shown in FIGS. 6 and 7, solid lines indicate a case in which the first retarder 6 and the second retarder 7 are disposed (the liquid crystal display device 10 shown in FIG. 3), and double dashed lines indicate a case in which the first retarder 6 and the second retarder 7 are not disposed (the liquid crystal display device 10' shown in FIG. 4) (this shall apply below).

In addition, a response time during a fall time (OFF) from the voltage V1 to the voltage V2 which have a magnitude relationship of V1>V2 is represented by τd, and a response time during a rise time (ON) from the voltage V2 to the voltage V1 is represented by τr (this shall apply below).

Meanwhile, ∂I/∂θd was obtained using a method of numerical differentiation (this shall apply below).

When the respective voltages V1 and V2 are applied to the liquid crystal cell 2, liquid crystal molecules in the liquid crystal layer form an angle of θd (V1) or θd (V2) calculated on the basis of the continuum elastic theory. When the voltage is switched from V1 to V2, the slope of the liquid crystal molecules is temporally changed from θd (V1) to θd (V2) according to a torque equation of a relaxation phenomenon. The amount of transmitted light I is obtained from Expressions 32c and 32d below using θd (t).

Here, in the liquid crystal display device 10 shown in FIG. 3 and the liquid crystal display device 10' shown in FIG. 4, the same liquid crystal cell (liquid crystal properties or panel components are also the same) 2 is used, and therefore the solutions for the torque equation of the relaxation phenomenon are the same as each other. Therefore, the amounts of transmitted light $I_2$ and $I_1$ are assumed to be similarly affected by the relaxation phenomenon. On the other hand, the mutual amounts of transmitted light $I_2$ and $I_1$ are different from each other with respect to the same θd. Reversely, θd's are different from each other in a case in which the mutual amounts of transmitted light $I_2$ and $I_1$ become the same as each other.

With an assumption of what has been described above, the case of HO shown in FIG. 6 will be described.

In the case of the optical response from the amount of transmitted light $I_1=I_2=1$ (both at θd=0°) to the amount of transmitted light Ia, individual values become as described below. In this case, it is shown that the change amount of θd of $I_2$ is small and sufficient and the absolute value of the differential coefficient of $I_2$ is also great, and the values double, and acceleration of τd is achieved.

Change amount of θd of $I_2$: 0°→θ2a
Change amount of θd of $I_1$: 0°→θ1a $|\partial I_2/\partial\theta d(\theta 2a)|>|\partial I_1/\partial\theta d(\theta 1a)|$ In the case of the gradation optical response from the amount of transmitted light $I_1=I_2=1a$ to the amount of transmitted light $I_1=I_2=1b$, individual values become as described below. In this case, it is shown that the change amount of θd of $I_2$ is slightly small and sufficient and the absolute value of the differential coefficient of $I_2$ in a (θ2a, θ2b) section is greater than the absolute value of the differential coefficient of $I_1$ in a (θ1a, θ1b) section, and acceleration of τd is achieved.

Change amount of θd of $I_2$: θ2a→θ2b
Change amount of θd of $I_1$: θ1a→θ1b $|\partial I_2/\partial\theta d(\theta 2a)|>|\partial I_1/\partial\theta d(\theta 1a)|$ $|\partial I_2/\partial\theta d(\theta 2b)|\geq|\partial I_1/\partial\theta d(\theta 1b)|$ Next, the case of VA shown in FIG. 7 will be described.

A section of θd corresponding to the response time τd is approximately (90°, 45°). In the case of "Rlc=Rf<π/2", the absolute value of the differential coefficient of $I_2$ in this section is smaller than that of $I_1$, and τd is significantly deteriorated due to disposition of the retarder. Conversely, in the case of "Rlc=Rf>π/2", the absolute value of the differential coefficient of $I_2$ in this section is greater than that of $I_1$, and τd is improved.

In a practically-used liquid crystal display device, the amount of transmitted light is not fully used from 0% to 100%. In addition, a liquid crystal display device is designed so that display qualities are maintained with respect to influences of a variety of factors such as an environmental temperature and a viewing angle.

Figure 8:
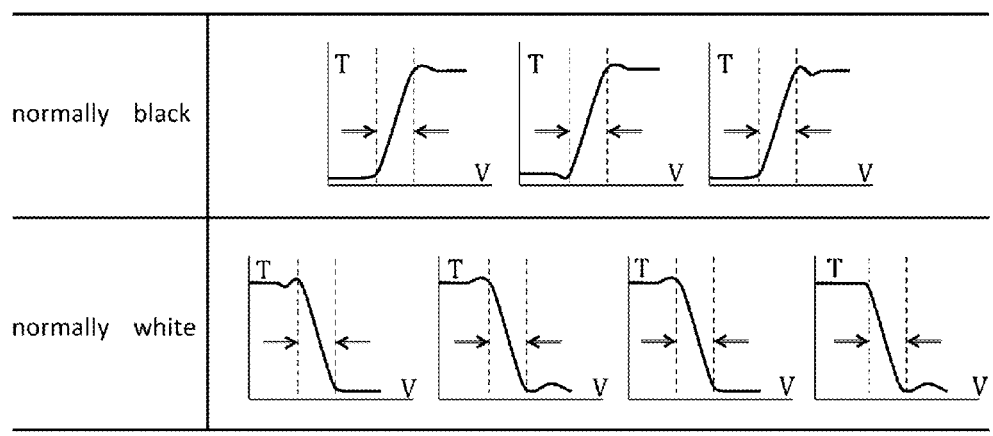
FIG. 8 shows graphs showing a variety of voltage-transmittance curves for normally white and normally black.

Here, a variety of voltage-transmittance curves in a case in which the amount of transmitted light from the rear surface side to the front surface side of the liquid crystal cell 2 when the driving voltage is applied becomes the maximum (normally white) and a case in which the amount of transmitted light from the rear surface side to the front surface side of the liquid crystal cell 2 when the driving voltage is applied becomes the minimum (normally black) are shown in FIG. 8.

Meanwhile, in FIG. 8, a gap between dashed lines indicates a region of the driving voltage. In regions other than this region, when there are positions at which the amount of transmitted light I reaches a local extreme value, errors occur in determination of the magnitude relationship between differential coefficients ∂I/∂θd(θd).

Since a display region of a liquid crystal display device is dependent on a desired design, it is difficult to specify the display region; however, conceptually, it is optimal to use the means of the present invention in an angular region of θd corresponding to a region used for displaying.

In addition, it is not usual for $I_2$ and $I_1$ to become the same "normally white" or the same "normally black", and it is obvious that any one of the amount of transmitted light and θd is used after being transformed so that it becomes possible to "improve the optical response during a fall time (OFF) from the voltage V1 to the voltage V2 which have a magnitude relationship of V1>V2" and a liquid crystal display device is optically designed so that the relationship of Expression (1) is obtained.

In order to avoid a simulation of an easily-caused error in the above description, the absolute value function is added to Expression (1); however, in the case of a simulation based on sufficient understanding, a liquid crystal display device may be designed without any absolute values. For example, in a case in which the amount of transmitted light $I_1$ is transformed and combined into which the amount of transmitted light $I_2$, it is possible to carry out as described below.

$I_1$ (θd)←"the amount of transmitted light which becomes the maximum in the numeric value of $I_1$"–$I_1$ (θd)

Meanwhile, θd of the liquid crystal molecule in the above description could be considered to be identical for all the thicknesses Δd of the liquid crystal layer. It is also possible to divide the thickness Δd of the liquid crystal layer into n parts, calculate θd of the $k^{th}$ divided layer using the continuum elastic theory, transform θd into a Mueller matrix, establish and proceed the following expression. This method is effective in a case in which accuracy is required. Meanwhile, in a case in which the depth of physical and optical understanding of an optical design and a new solution for the problem or selection diversity are required, simplification is also effective.

$Dp=D^1(\Psi d^1,\Gamma d^1)\ldots D^k(\Psi d^k,\Gamma d^k)\ldots D^n(\Psi d^n,\Gamma d^n)$ Next, a variety of simulation results will be described.

Meanwhile, the simulation results described below are all examples in which the liquid crystal optical element 10 shown in FIG. 3 is used.

In addition, a variety of conditions of the liquid crystal optical element 10 were set to be common as described below.

Disposition of the first polarization plate 3 and the second polarization plate 4: (φp, φa)=(45°, 135°)
Disposition of the liquid crystal cell 2: (φd)=(0°)
Disposition of the first retarder 6: (θc, φc)=(90°, 90°)
Disposition of the second retarder 7: identity matrix Meanwhile, an A plate is used as the first phase plate 6, and, with intention of simple description, the second phase plate 7 is not disposed (the Mueller matrix is transformed to an identity matrix). The liquid crystal cell 2 is in a horizontal alignment (HO).

Figure 9:
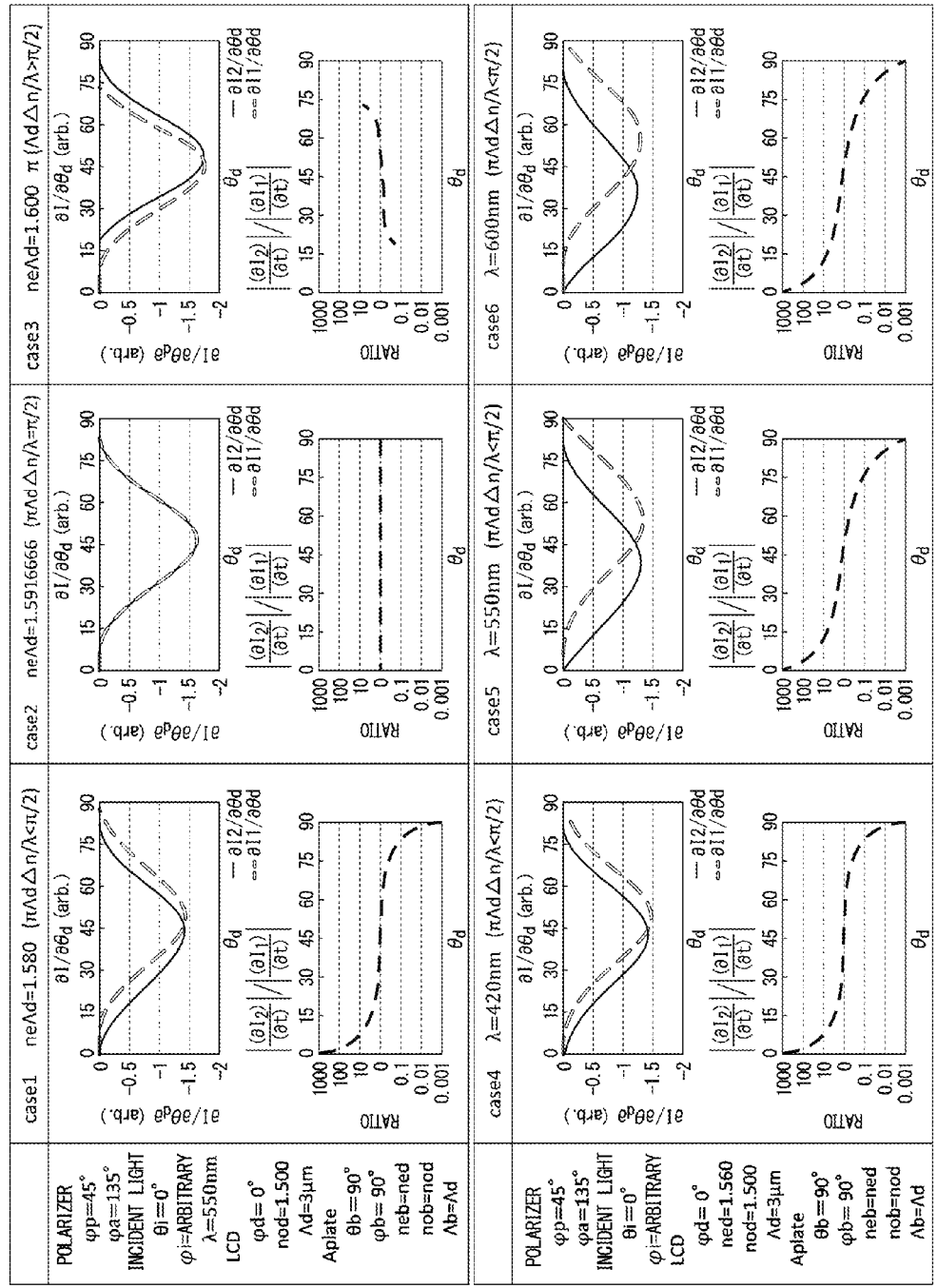
FIG. 9 shows graphs showing examples of a simulation result in the case of vertical incident light.
Figure 10:
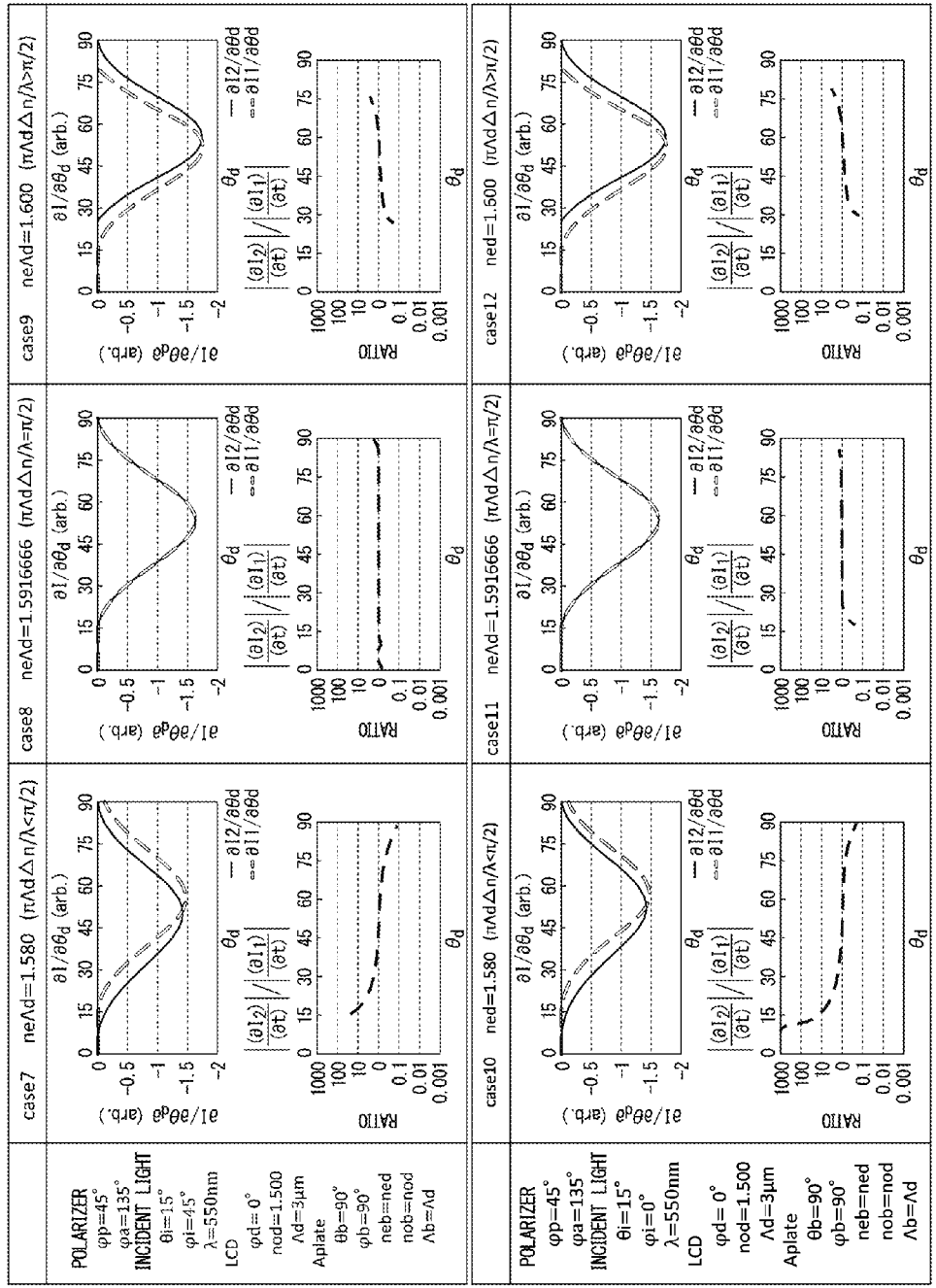
FIG. 10 shows graphs showing examples of a simulation result of a change in a viewing angle with respect to incident light.

In addition, FIGS. 9 and 10 also shown ratios of temporal changes of the amounts of transmitted light of Expression 32g.

[Simulation Result of ned and Incidence Wavelength]

FIG. 9 shows examples of a simulation result in the case of vertical incident light.

In Cases 1 to 3 shown in FIG. 9, the wavelength λ was set to 550 nm, and ned's were set to 1.58, 1.5916666, and 1.600, respectively.

In Cases 4 to 6 shown in FIG. 9, ned−nod was 0.06, and the incidence wavelength was changed to 420 nm, 550 nm, and 600 nm, respectively.

From the results of Cases 1 to 3, it was shown that Expression (1) was satisfied only in Case 1 and both the liquid crystal layer and the retarder might be optically designed so as to set $\pi \Lambda \Delta n/\lambda < \pi/2$.

From the results of Cases 4 to 6, it was shown that, when Δn was set to approximately 0.06, light from a backlight satisfied Expression (1) with respect to all of the three primitive colors (RGB) and τd could be improved.

In addition, it was confirmed that an optical design by means of comparison between degrees of ∂I/∂θd's and an optical design by means of a ratio between temporal changes of Expression 32g produced the same result.

Meanwhile, in Case 3, the reason for a chipped curve being formed throughout the entire region of θd=(0°, 90°) is that, as shown in FIG. 8, a region unsuitable for use was generated.

[Simulation Result of Change in Viewing Angle]

FIG. 10 shows examples of a simulation result of a change in the viewing angle with respect to incident light.

In the present examples, since the intensity of transmitted light relative to incident light is observed, the orientation of a viewing angle for observation matches the orientation of the incident light (θi, φi).

Cases 7 to 9: (θi, φi)=(15°, 45°)
Cases 10 to 12: (θi, φi)=(15°, 0°)

From the results of Cases 7 to 9, it was shown that Expression (1) was satisfied only in Case 7 and both the liquid crystal layer and the retarder might be optically designed so as to set $\pi \Lambda \Delta n/\lambda < \pi/2$.

From the results of Cases 10 to 12, it was shown that Expression (1) was satisfied only in Case 10 and both the liquid crystal layer and the retarder might be optically designed so as to set $\pi \Lambda \Delta n/\lambda < \pi/2$. That is, it was shown that, under an optical design condition derived from vertical incidence, an improvement effect of accelerating τd in a relatively wide viewing angle range is maintained.

[Simulation Result of Phase Difference Between Liquid Crystal Layer and Retarder when Thickness of Liquid Crystal Layer is Changed]

Figure 11:
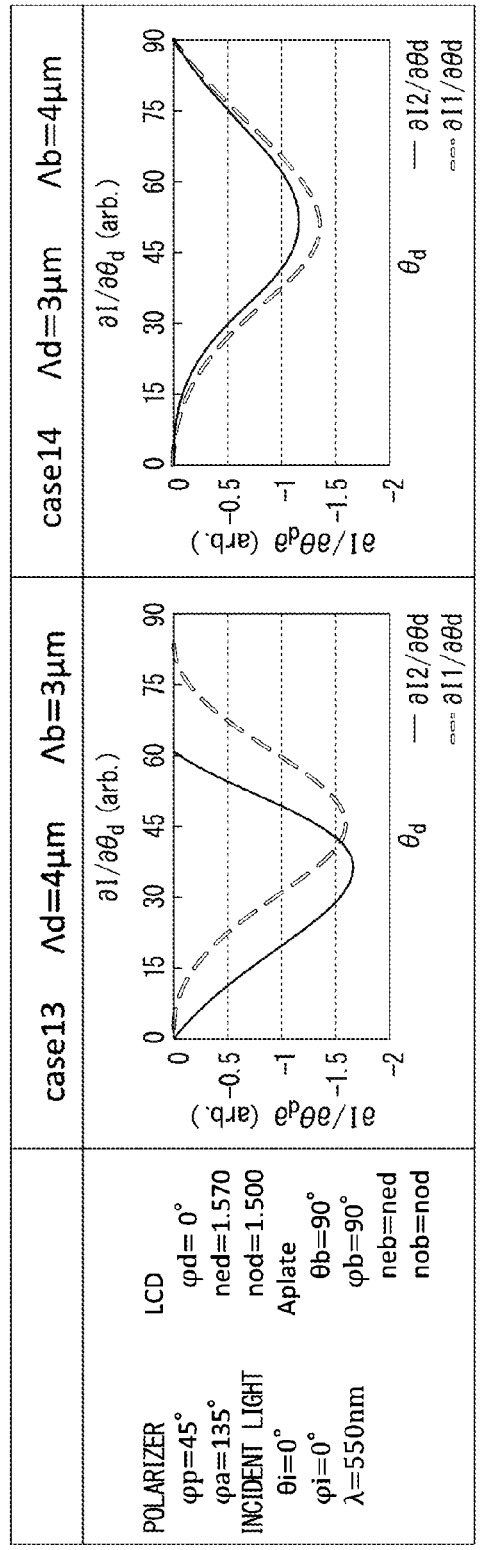
FIG. 11 shows graphs showing examples of a simulation result of a phase difference between a liquid crystal layer and a retarder in a case in which the thickness of the liquid crystal layer is changed.

FIG. 11 shows examples of a simulation result of a phase difference between the liquid crystal layer and the retarder when the thickness of the liquid crystal layer is changed. In the present examples, the thickness Λ of the liquid crystal layer is changed, and thus the phase differences between the liquid crystal layer and the phase plate are made to be unequal to each other as described below.

Case 13: Λd=4 μm, Λd (ned−nod)=0.28, Λb=3 μm, Λd (neb−nob)=0.21

Case 14: Λd=3 μm, Λd (ned−nod)=0.21, Λb=4 μm, Λd (neb−nob)=0.28

Case 13 belongs to the present invention because Expression (1) is satisfied, and Case 14 does not belong to the present invention because Expression (1) is not satisfied. The results including the results of Cases 1 and 3 are shown in Table 2 below.

TABLE 2

| Case No. | Expression (1) | ΛΔn/λ of liquid crystal layer | ΛΔn/λ of retarder |
|---|---|---|---|
| 1 | Satisfied | <½ | <½ |
| 3 | Unsatisfied | >½ | >½ |
| 13 | Satisfied | >½ | <½ |
| 14 | Unsatisfied | <½ | >½ |

From the results shown in Table 2, it was clarified that Case 1 was not a necessary and sufficient condition for satisfying Expression (1). Certainly, it is assumed that a more stable effect of τd is exhibited in Case 1.

[Simulation Result of Optical Measurement]

Figure 12:
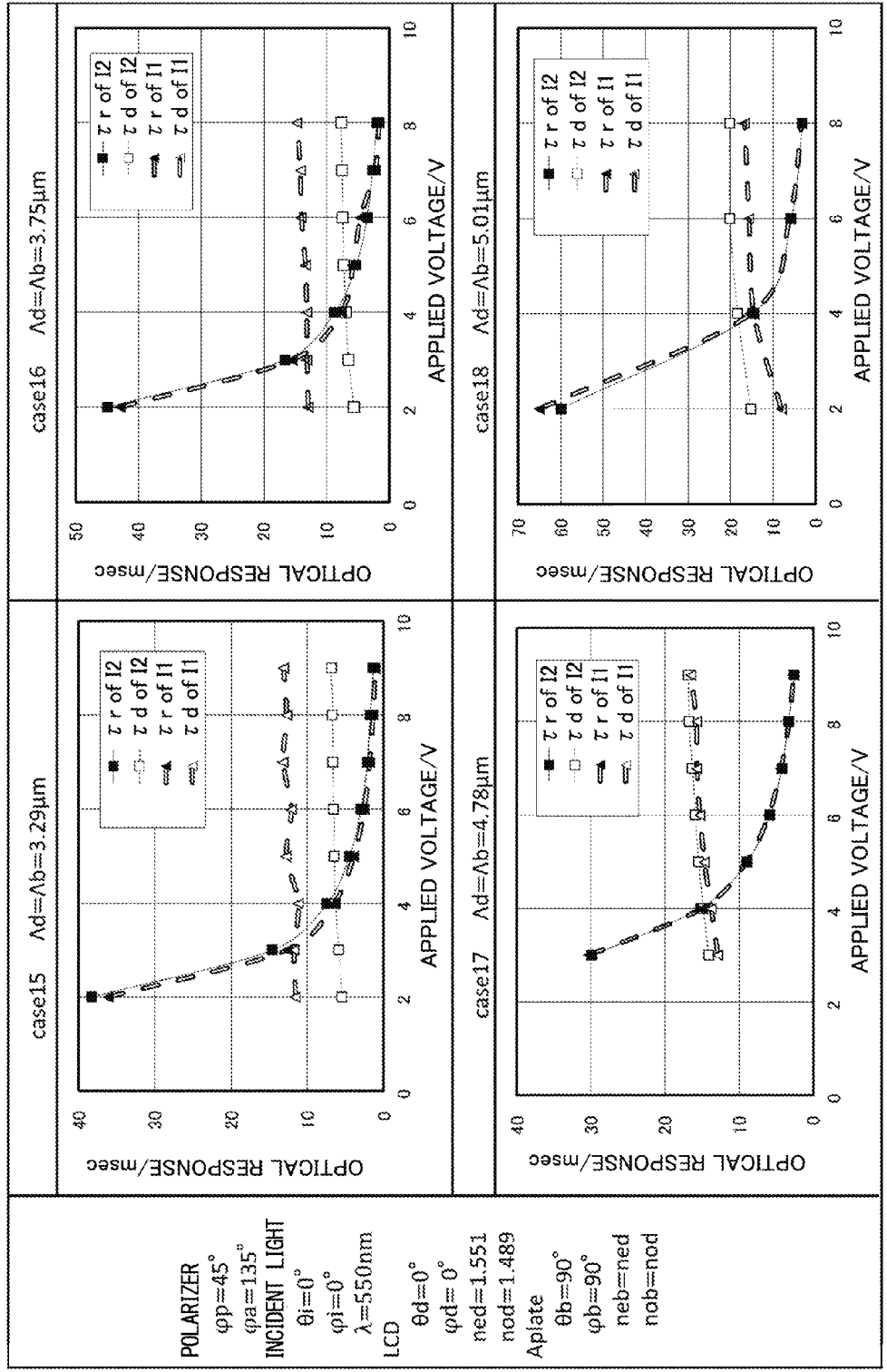
FIG. 12 shows graphs showing examples of a simulation result obtained by differing the phase difference between the liquid crystal layer and the retarder in a case in which the thickness of the liquid crystal layer is changed.

FIG. 12 shows Cases 15 to 18 in which the phase difference between the liquid crystal layer and the retarder in a case in which the thickness of the liquid crystal layer was changed was altered and the response time τd during a fall time (OFF) and the response time τr during a rise time (ON) were measured.

In the present examples, the same liquid crystal material (ned−nod=0.062) was injected into the liquid crystal cells having a thickness Λ of 3.29 μm, 3.75 μm, 4.78 μm, and 5.01 μm, and two LCDs were produced.

One of the produced LCDs was used as a phase plate, and a liquid crystal display device was assembled in the same disposition as the liquid crystal display device 10 shown in FIG. 3. The wavelength of light used for measurement was set to 550 nm.

When the magnitude relationship of the voltage was set to V1>V2, the "applied voltage" shown in graphs in FIG. 12 was set to 1 V, V2 was set to 0 V, and the response time τd during a fall time (OFF) from the voltage V1 to the voltage V2 and the response time τr during a rise time (ON) from the voltage V2 to the voltage V1 were measured. In addition, the results of Cases 15 to 18 are shown in Table 3 below.

TABLE 3

| Case No. | Expression (1) | ΛΔn/λ of liquid crystal layer and retarder | Results of τd |
|---|---|---|---|
| 15 | Satisfied | <½ | Improved by approximately 50% |
| 16 | Satisfied | <½ | Improved by approximately 50% |
| 17 | Equal | ≈½ | No change |
| 18 | Unsatisfied | >½ | Deteriorated by 20% to 50% |

From the results shown in Table 3, the following (i) to (iii) were shown.

(i) Improvement in τd could be confirmed from satisfaction of Expression (1).

(ii) Derivation of the formula of the amount of transmitted light relative to an arbitrary disposition and Expressions 32e to 32g which were temporal differentiation expressions were verified.

(iii) The improvement effect was particularly significant (halving the viscosity γ1 of a liquid crystal material for improving response still remains as an extremely difficult problem at the moment).

Meanwhile, the present invention showed that the response time it during a rise time was deteriorated, but it was shown that the results were strongly dependent on the "applied voltage" V1 and the improvements were similar to those obtained by compensating the overdrive method (3), the double speed drive method (4), and the like which have been described in the section of the background art.

[Optical Measurement of Halftone]

Table 4 shows the measurement results of the response times τd of halftone in Cases 15 to 17.

From the results shown in Table 4, it is found that the response times τd in Cases 15 to 16 satisfying Expression (1) shown above were significantly improved compared to Case 17 by 50% to 60% in any gradations.

TABLE 4

| | Halftone response (msec) | | | | | |
|---|---|---|---|---|---|---|
| | Case No. | | | | | |
| | Case 15 | | Case 16 | | Case 17 | |
| Measurement type | τd of I2 | τd of I1 | τd of I2 | τd of I1 | τd of I2 | τd of I1 |
| Transmittance 10% ⇔ 50% | 8.6 | 18.9 | 8.6 | 13.9 | 23.8 | 24.1 |
| Transmittance 10% ⇔ 90% | 1.6 | 4.7 | 1.8 | 5.2 | 6.1 | 6.0 |
| Transmittance 50% ⇔ 50% | 1.2 | 3.0 | 1.4 | 3.6 | 4.7 | 5.1 |

REFERENCE SIGNS LIST

1 . . . liquid crystal display device, 2 . . . liquid crystal cell, 3 . . . first polarization plate, 4 . . . second polarization plate, 5 . . . retarder (optical compensation plate), 6 . . . first retarder (optical compensation plate), 7 . . . second retarder (optical compensation plate), 20 . . . liquid crystal cell, 21 . . . first substrate, 22 . . . second substrate, 23 . . . liquid crystal layer, 24a, 24b . . . alignment layer, 25a, 25b . . . transparent electrode (electrode), 30 . . . liquid crystal cell, 31 . . . first substrate, 32 . . . second substrate, 33 . . . liquid crystal layer, 34a, 34b . . . alignment layer, 35 . . . transparent electrode (electrode)

What is claimed is:

1. A method for improving optical response,
  wherein, in a liquid crystal display device comprising:
    a liquid crystal cell including:
      a first substrate and a second substrate disposed opposite to each other,
      a liquid crystal layer sandwiched between the first substrate and the second substrate,
      an alignment layer that controls the alignment state of the liquid crystal layer between the first substrate and the second substrate, and
      an electrode that changes the alignment state of the liquid crystal layer using an electric field generated by application of a driving voltage;
    a first polarization plate and a second polarization plate which are disposed on a rear surface side and a front surface side of the liquid crystal cell and in which orientations of individual transmission axes are set so that the amount of transmitted light through the liquid crystal cell from the rear surface side to the front surface side is maximized or minimized when the driving voltage is applied; and
    an optical compensation plate which is disposed between the first polarization plate and the liquid crystal cell and/or between the second polarization plate and the liquid crystal cell and optically compensates for light passing therebetween,
  when a differential coefficient of the amount of transmitted light $I_1$ with respect to a time t when the driving voltage is turned off from on in a case in which the optical compensation plate is not disposed is represented by $\partial I_1/\partial t$, and a differential coefficient of the amount of transmitted light $I_2$ with respect to the time t when the driving voltage is turned off from on in a case in which the optical compensation plate is disposed is represented by $\partial I_2/\partial t$, in an area relative to a response time τt during a fall time, a phase difference in the liquid crystal layer and a phase difference in the optical compensation plate are optically designed so as to satisfy a relationship of Expression (1) shown below:

$$|\partial I_2/\partial t| > |\partial I_1/\partial t| \quad (1)$$

thereby improving the optical response during a fall time from a voltage V1 to a voltage V2 which have a magnitude relationship of V1>V2.

2. The method for improving optical response according to claim 1,
  wherein the first polarization plate and the second polarization plate have a positional relationship in which individual transmission axes thereof are orthogonal to each other when seen in a normal direction,
  the liquid crystal layer and the optical compensation plate have a positional relationship in which the slow axes of the liquid crystal layer without applying the drive voltage and the slow axes of the optical compensation plate are orthogonal to each other when seen in a normal direction, and
  an angle in radian formed by the transmission axis of the first polarization plate and the slow axis of the liquid crystal layer is π/4.

3. The method for improving optical response according to claim 1,
  wherein, in the liquid crystal cell, the liquid crystal layer is driven in a voltage control birefringence mode.

4. The method for improving optical response according claim 1,
  wherein, in the liquid crystal cell, when the driving voltage is not applied, the alignment state of the liquid crystal layer is a horizontal alignment.

5. The method for improving optical response according to claim 4,
  wherein, in the liquid crystal layer and the optical compensation plate, phase differences in radian caused by individual retardations occurring when the driving voltage is turned off are made to be equal to each other and are smaller than π/2.

6. The method for improving optical response according to claim 1,
  wherein, in the liquid crystal cell, when the driving voltage is not applied, the alignment state of the liquid crystal layer is a vertical alignment.

7. The method for improving optical response according to claim 1,
  wherein the optical compensation plate is a retarder.

8. The method for improving optical response according to claim 7,
  wherein the retarder includes any one of an A plate, a C plate, and a biaxial plate.

9. The method for improving optical response according to claim 1,
  wherein the optical compensation plate is a liquid crystal cell for optical compensation.

10. The method for improving optical response according to claim 1, wherein the liquid crystal layer includes any one of a nematic liquid crystal, a smectic liquid crystal, a cholesteric liquid crystal, and a ferroelectric liquid crystal.

11. The method for improving optical response according to claim 10,
wherein the liquid crystal layer includes liquid crystal compounds represented by General Formulae (L1) to (L3) shown below:

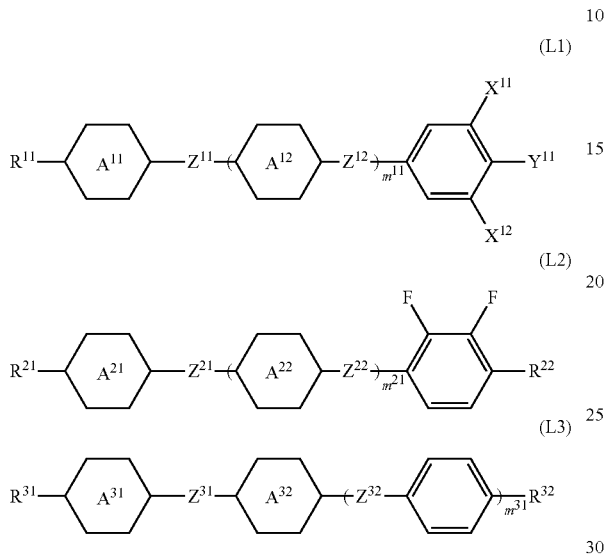

wherein, each of $R^{11}$ to $R^{32}$ independently represents an alkyl group, alkoxy group, alkenyl group, or alkenyloxy group having 1 to 15 carbon atoms, and
each of $A^{11}$ to $A^{32}$ independently represents any one of the following structures:

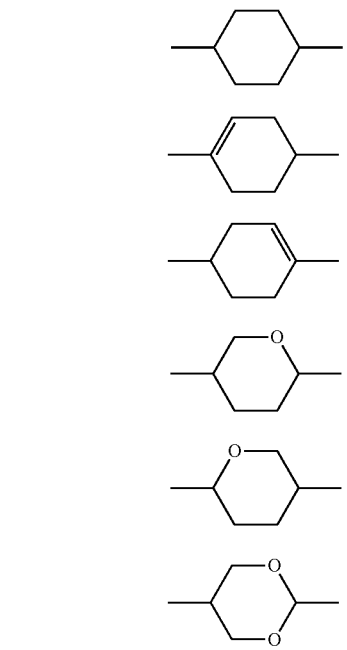

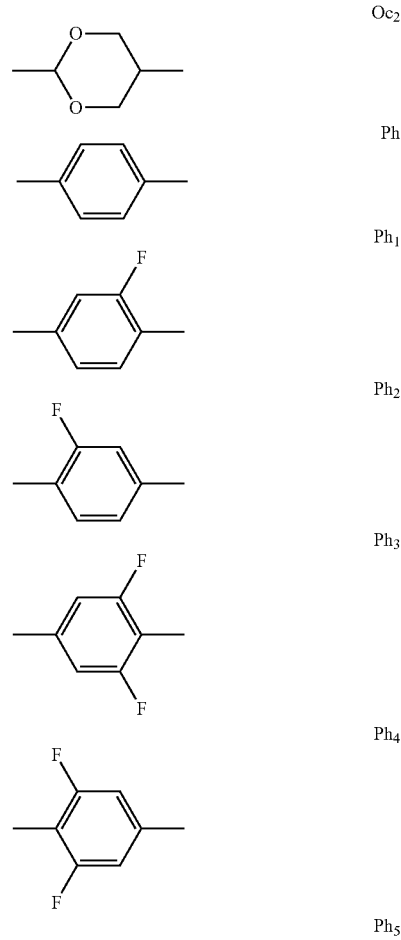

wherein, each of $Z^{11}$ to $Z^{32}$ independently represents a single bond, —CH=CH—, —C≡C—, —CH$_2$CH$_2$—, —(CH$_2$)$_4$—, —OCH$_2$—, —CH$_2$O—, —OCF$_2$—, or —CF$_2$O—,
each of $m^{11}$ to $m^{31}$ independently represents an integer from 0 to 3,
each of $X^{11}$ and $X^{12}$ independently represents —H, —Cl, or —F, and
$Y^{11}$ represents —CN, —Cl, —F, —OCHF$_2$, —CF$_3$, —OCF$_3$, or an alkyl group, alkoxy group, alkenyl group, or alkenyloxy group having 2 to 5 carbon atoms.

12. The method for improving optical response according to claim 1,
wherein the liquid crystal cell includes a nonlinear active element electrically connected to the electrode.

13. The method for improving optical response according to claim 1,
wherein the alignment layer includes any one of a polyimide, a polyamide, chalcone, cinnamate, and cinnamoyl.

* * * * *